US010627083B2

(12) United States Patent
Tuchler et al.

(10) Patent No.: US 10,627,083 B2
(45) Date of Patent: Apr. 21, 2020

(54) TRACK LIGHTING SYSTEM

(71) Applicants: Chocolate Lighting Company Ltd, Herzlia B (IL); H4X e.U., Graz (AT)

(72) Inventors: Gideon Tuchler, Herzlia B (IL); Andreas Hierzer, Graz (AT)

(73) Assignees: Chocolate Lighting Company Ltd, Herzlia B (IL); H4X e.U., Graz (AT)

(*) Notice: Subject to any disclaimer, the term of this patent is extended or adjusted under 35 U.S.C. 154(b) by 0 days.

(21) Appl. No.: 16/327,838

(22) PCT Filed: Aug. 24, 2016

(86) PCT No.: PCT/IL2016/050924

§ 371 (c)(1),
(2) Date: Feb. 24, 2019

(87) PCT Pub. No.: WO2018/037396

PCT Pub. Date: Mar. 1, 2018

(65) Prior Publication Data

US 2019/0195473 A1 Jun. 27, 2019

(51) Int. Cl.
*F21V 21/005* (2006.01)
*F21V 21/34* (2006.01)
(Continued)

(52) U.S. Cl.
CPC .......... *F21V 21/005* (2013.01); *F21V 21/041* (2013.01); *F21V 21/34* (2013.01);
(Continued)

(58) Field of Classification Search
CPC ...... F21V 21/005; F21V 21/041; F21V 21/34; F21V 21/001; F21V 23/001; F21V 23/06;
(Continued)

(56) References Cited

U.S. PATENT DOCUMENTS 3,801,951 A 4/1974 Kemmerer et al.
5,226,724 A 7/1993 Kanarek
(Continued)

FOREIGN PATENT DOCUMENTS

EP 2479851 7/2012
EP 2657590 10/2013
WO WO 2018/037396 3/2018

OTHER PUBLICATIONS

Communication Relating to the Results of the Partial International Search and the Provisional Opinion dated May 3, 2017 From the International Searching Authority Re. Application No. PCT/IL2016/050924. (10 Pages).

(Continued)

*Primary Examiner* — Anne M Hines

(57) ABSTRACT

A modular system comprising track-mounted fixtures and track is described. In some embodiments, fixtures access electrical power through electrified railings recessed within a relatively narrow power slot of the track. Primary mechanical support of the fixture weight is optionally provided from a magnetic mounting surface surrounding the power slot. The track cross-section optionally provides mounting surface area on mounting wings, allowing a narrower slot housing. Optionally, secondary mechanical support provided within the slot comprises a deployable anchoring element which laterally expands into a receiving area. Optionally, deployment comprises rotation of the anchoring element. The anchoring element, in some embodiments, acts as a secondary mechanical support, preventing, for example, accidental detachment of the fixture from the slot, without preventing repositioning movements of the fixture along the slot, even when fully deployed.

20 Claims, 15 Drawing Sheets

(51) Int. Cl.

| | |
|---|---|
| ***F21V 23/06*** | (2006.01) |
| ***F21V 21/04*** | (2006.01) |
| ***F21V 23/00*** | (2015.01) |
| ***H01R 13/62*** | (2006.01) |
| ***H01R 25/14*** | (2006.01) |
| ***H01R 31/06*** | (2006.01) |

(52) U.S. Cl.
CPC ............ *F21V 23/001* (2013.01); *F21V 23/06* (2013.01); *H01R 13/6205* (2013.01); *H01R 25/142* (2013.01); *H01R 25/145* (2013.01); *H01R 31/065* (2013.01)

(58) Field of Classification Search
CPC . H01R 25/142; H01R 25/145; H01R 13/6205
See application file for complete search history.

(56) References Cited

U.S. PATENT DOCUMENTS

| | | | | |
|---|---|---|---|---|
| 5,803,755 | A | 9/1998 | Kuchar et al. | |
| 6,364,508 | B1 | 4/2002 | Moreland | |
| 2009/0279298 | A1* | 11/2009 | Mier-Langner | F21V 21/096 362/235 |
| 2010/0118556 | A1 | 5/2010 | Long | |
| 2010/0321929 | A1 | 12/2010 | Ramirez et al. | |
| 2016/0033098 | A1* | 2/2016 | Bergman | H02G 3/20 362/418 |
| 2019/0082627 | A1* | 3/2019 | Moffitt | A01G 31/06 |

OTHER PUBLICATIONS

International Preliminary Report on Patentability dated Mar. 7, 2019 From the International Bureau of WIPO Re. Application No. PCT/IL2016/050924. (10 Pages).

International Search Report and the Written Opinion dated Jul. 4, 2017 From the International Searching Authority Re. Application No. PCT/IL2016/050924. (17 Pages).

International Search Report and the Written Opinion dated Dec. 23, 2016 From the International Searching Authority Re. Application No. PCT/IL2016/050924. (14 Pages).

Buschfeld "System LightLight® IN", Buschfeld Sense System, Systeminfo, 1 P., Last Update May 2016.

* cited by examiner

TRACK LIGHTING SYSTEM

RELATED APPLICATIONS

This application is a National Phase of PCT patent application No. PCT/IL2016/050924 having International filing date of Aug. 24, 2016. The contents of the above applications are all incorporated by reference as if fully set forth herein in their entirety.

This application is related to International Patent Application No. PCT/IL2016/050190 and to International Patent Application No. PCT/IL2016/050189, the contents of which are incorporated herein in their entirety.

FIELD AND BACKGROUND OF THE INVENTION

The present invention, in some embodiments thereof, relates to the field of artificial illumination systems, and more particularly, to track lighting systems.

Track lighting systems provide means of selectably positioning and/or directing illumination; for example, according to the particular, possibly dynamic, needs of an illuminated space. A typical track lighting system comprises track and luminaire components. Tracks support power distribution to and mechanical mounting of one or more luminaires at a plurality of positions (usually continuously) along their extent. Luminaires convert power to illumination, including determination of illumination parameters such as intensity, directionality, angle of spread and/or color.

Once mounted, track lighting systems allow flexibility in determining lighting conditions, and optionally allow changes according to changes in requirements. For example, luminaires are moveable along the track and/or re-orientable relative to the track. In some track lighting systems, luminaires attached to the track can be removed, added, and/or exchanged according to need.

The visual impact of the lighting system overall comprises the light provided, but also the appearance of the track, the luminaires, and their integration with their surroundings when mounted to a ceiling, wall, and/or other support member.

SUMMARY OF THE INVENTION

According to an aspect of some embodiments of the present disclosure, there is provided a track component for a track lighting system, the track component comprising a track housing having: a slot housing sized for receiving a fixture mounting adaptor within a slot volume located between two outer side-walls extending dorsally alongside each other from a slotted face-wall and on either side of an aperture to the slot volume in the slotted face-wall; and two mounting wings, each mounting wing comprising a wall extending laterally from a base region integrally attached to a respective one of the side-walls where the side-wall meets the slotted face-wall; wherein each mounting wing laterally terminates in a region dorsally offset from the base region.

According to some embodiments of the present disclosure, the slot aperture is about 8 mm wide or less.

According to some embodiments of the present disclosure, the maximum width of the slot housing is 25 mm or less.

According to some embodiments of the present disclosure, a width of the track housing measured between lateral terminations of the mounting wings is in the range of about 80-120 mm.

According to some embodiments of the present disclosure, the track component comprises at least one magnetically attracted mounting strip attached to the track housing by a mounting strip anchor; wherein the mounting strip anchor is at least partially defined by one of the mounting wings.

According to some embodiments of the present disclosure, the mounting strip anchor comprises a slot region sized to receive and hold the magnetically attracted mounting strip.

According to some embodiments of the present disclosure, the mounting strip anchor slot region is defined in part along a longitudinal extent of the slotted face-wall, and in part along a longitudinal extent of the mounting wing.

According to some embodiments of the present disclosure, each mounting wing defines a longitudinally extending alignment channel, open on at least one longitudinal end to receive an alignment pin for aligning the track housing to another track housing.

According to an aspect of some embodiments of the present disclosure, there is provided the track component, provided together with at least one of the alignment pins.

According to some embodiments of the present disclosure, the track component comprises a longitudinally oriented slot open along the alignment channel.

According to some embodiments of the present disclosure, the alignment pin includes a plurality of fastening members positioned longitudinally along the alignment pin, and operable to affix the alignment pin within the alignment channel by access through the longitudinally oriented slot open along the alignment channel.

According to some embodiments of the present disclosure, the mounting wing wall extends: laterally from the base region through a support section to define, along with the slotted face-wall, a mounting face for support of modules inserted to the slot of the track housing; then laterally and dorsally through an intermediate section to reach the region dorsally offset from the base region; and then laterally to define a mounting flange within the region dorsally offset from the base region.

According to some embodiments of the present disclosure, the dorsal offset of the mounting flange is within the range of about 10 mm to about 30 mm.

According to some embodiments of the present disclosure, the dorsal offset of the mounting flange is about 11 mm.

According to some embodiments of the present disclosure, the track housing comprises extruded aluminum, and cross-sectional shapes of the slot housing and mounting wings are defined by an extrusion profile of the track housing.

According to some embodiments of the present disclosure, the track component comprises power contact assemblies comprising electrical power rails extending longitudinally along the track and within the slot; and provided together with at least one mounting adaptor sized to fit within the slot and make electrical contacts with the electrical power rails.

According to some embodiments of the present disclosure, the track component comprises two of the electrical power rails, one on either side of the slot.

According to some embodiments of the present disclosure, the mounting adaptor comprises a power outlet connector, and a control module configured to control the delivery, including polarity, of electrical power routed between the electrical contacts with the electrical power rails and the power outlet connector.

According to some embodiments of the present disclosure, the controller comprises a receiver for wireless communication, and control by the control module is configured by input to the receiver for wireless communication.

According to some embodiments of the present disclosure, the at least one mounting adaptor is configured to fit across a juncture between two sections of the track housing, and to electrically connect between the respective power rail assemblies of each of the two sections.

According to some embodiments of the present disclosure, the corner connector comprises two track housing sections having a cross-sectional profile of the track housing, integrally attached to each other at the bent angle.

According to some embodiments of the present disclosure, the corner connector comprises one or more alignment pins insertable to receiving channels of the two sections of track housing, the one or more alignment pins being bent at the bent angle.

According to some embodiments of the present disclosure, the mounting adaptor is attached in a mounting assembly with a mounting module including magnetically attracted material, and the mounting assembly is sized and shaped so that the mounting assembly is magnetically held to magnetic material attached to the track housing when the mounting adaptor is inserted to the slot to make electrical contacts with the power contact assemblies.

According to an aspect of some embodiments of the present disclosure, there is provided an electrical connection subsystem for a narrow-slot track lighting system, comprising: a segmented track housing defining a slot aperture 8 mm wide or less extending along a longitudinal extent of the track housing, and a slot region within the track housing and accessed through the slot aperture, each segment of the track housing being configured for the delivery of electrical power from rails extending longitudinally within the slot; an electrical connection insert, sized for fitted insertion to the slot region at a juncture between two adjacent track housing segments, and comprising electrical contacts positioned to contact the rails of each adjacent track housing segment, the electrical contacts being electrically interconnected for transmission of electrical power across the juncture.

According to some embodiments of the present disclosure, the electrical connection insert comprises a housing shaped so that insertion of the electrical connection insert to the slot and crossing the juncture aligns the electrical contacts for transmission of electrical power across the juncture.

According to some embodiments of the present disclosure, the electrical connection insert comprises two electrically interconnected housings, each insert housing shaped so that insertion of each to one of the adjacent track housing segments aligns the electrical contacts for transmission of electrical power across the juncture.

According to some embodiments of the present disclosure, two electrically interconnected housings are interconnected through a bent angle, such that electrical power can be transmitted through the juncture when the juncture comprises a bent angle.

According to an aspect of some embodiments of the present disclosure, there is provided components of a track lighting system comprising: a track housing sized for receiving a fixture mounting adaptor within a slot volume located between two outer side-walls extending dorsally alongside each other from a slotted face-wall and on either side of an aperture to the slot volume in the slotted face-wall; and the fixture mounting adaptor, sized to fittingly insert to slot volume through the aperture; wherein the track includes an interior recessed region recessed from the walls of the mounting slot on either side of the mounting slot, and located adjacent to an interior side of the slotted face-wall, the recessed region also extending longitudinally along the slot; and wherein the fixture mounting adaptor comprises an anchoring element positioned to be aligned with and expand into the interior recessed region when the fixture mounting adaptor is fully inserted into the mounting slot.

According to some embodiments of the present disclosure, the track comprises power contact assemblies comprising electrical power rails extending longitudinally along the track and within the mounting slot; and the fixture mounting adaptor includes electrical contacts configured to receive electrical power from the power contact assemblies, when the fixture mounting adaptor is fully inserted into the mounting slot.

According to some embodiments of the present disclosure, the components include at least one electrical connection insert configured to fit across a juncture between two sections of the track housing, and to electrically connect between the respective power rail assemblies of each of the two sections.

According to some embodiments of the present disclosure, the fixture mounting adaptor is attached in a mounting assembly with a mounting module including magnetically attracted material, and the mounting assembly is sized and shaped so that the mounting assembly is magnetically held to magnetic material attached to the track when the fixture mounting adaptor is fully inserted to the mounting slot.

According to some embodiments of the present disclosure, the components include a plurality of segments of the track housing, and at least one corner piece segment of track housing wherein the track slot comprises a bent angle.

According to some embodiments of the present disclosure, the components include a plurality of segments of the track housing, and at least one alignment pin insertable and affixable to an alignment channel of each of two adjacent track housing segments, to form an attachment therebetween.

According to an aspect of some embodiments of the present disclosure, there is provided a mechanical connection subsystem for track segments of a track lighting system, the subsystem comprising: a segmented slotted track housing defining a fixture-supporting slot extending along a longitudinal extent of the track housing; and at least two alignment slots, each defining a respective slot aperture extending longitudinally along opposite longitudinal sides of the fixture-supporting slot; wherein the alignment slots are open on at least one longitudinal end to receive a portion of an alignment pin for aligning adjacent segments of slotted track housing at a juncture therebetween.

According to some embodiments of the present disclosure, the alignment pins are larger in diameter than the longitudinal slot apertures of the alignment slots, so that they are prevented from exiting the alignment slot.

According to some embodiments of the present disclosure, the alignment pins comprise a fastening mechanism accessible through the longitudinal slot apertures of the alignment slots, to secure each alignment pin to the slotted track housing.

According to an aspect of some embodiments of the present disclosure, there is provided a fixture mounting adaptor for insertion to a mounting slot of a track of a track lighting system, the mounting slot having an entrance aperture with a width less than 8 mm across, wherein the mounting adaptor comprises: a housing having a width sized for fitting insertion into the mounting slot via the entrance aperture; and a rotatable anchoring element attached to the housing, configurable to a first orientation fitting within the width of the entrance aperture during insertion of the housing to the track, and rotatable from the first orientation to a second orientation extending beyond the width of the entrance aperture into a recessed region of the track; wherein the rotatable anchoring element in the second orientation is sized and shaped to freely move along with the housing through the recessed region along a longitudinal axis of the track.

According to some embodiments of the present disclosure, the mounting adaptor comprises electrical contacts positioned to electrically contact power rails within the slot of the track, and the rotatable anchoring element aligns the fixture mounting adaptor in a position where electrical contact is maintained upon the movement of the housing along the longitudinal axis of the track.

According to some embodiments of the present disclosure, the anchoring element is biased by a tensioning member to rotate into from the first to the second orientation.

According to some embodiments of the present disclosure, tension tending to rotate the anchoring element from the first to the second orientation is developed in the tensioning member upon insertion of the housing into the mounting slot.

According to some embodiments of the present disclosure, rotation of the rotatable anchoring element from the first orientation to the second orientation is prevented by a removable blocker.

According to some embodiments of the present disclosure, the removable blocker comprises a tape extending across the rotatable anchoring element held in the first orientation, and includes a pull member extending from the tape to a position which is accessible from outside the mounting slot when the fixture mounting adaptor is inserted to the mounting slot.

According to some embodiments of the present disclosure, pulling on the pull member removes the tape from the fixture mounting adapter, releasing the rotatable anchoring element to rotate into the recessed region.

According to some embodiments of the present disclosure, the anchoring element comprises magnetic material, positioned on the anchoring element so that the anchoring element is rotated to the second orientation by magnetic attraction between the track and the magnetic material, when the fixture mounting adaptor is inserted into the mounting slot.

According to some embodiments of the present disclosure, the fixture mounting adaptor includes the track comprising the recessed region into which the rotatable anchoring element extends.

According to some embodiments of the present disclosure, the recessed region includes a blocked section, wherein the block in the blocked section is shaped to press against and rotate the rotatable anchoring element back to the first orientation when the fixture mounting adaptor is positioned near to the blocked section, allowing the fixture mounting adaptor to be removed from the mounting slot.

According to some embodiments of the present disclosure, the fixture mounting adaptor includes a collapsing tool comprising a releasing member attached to a handle at a relative position where the releasing member is positionable to occupy a portion of the recessed region when it is inserted along with a portion of the handle into the mounting slot; wherein the releasing member extends longitudinally from the handle to a sufficient distance that it can be maneuvered alongside the mounting adapter in the mounting slot to press the rotatable anchoring element back to the first orientation.

According to some embodiments of the present disclosure, a pin portion of the rotatable anchoring element comprises a tool receiving shape accessible from the exterior of the fixture mounting adaptor, the tool receiving shape being formed to transmit torque from a received portion of a tool so that the rotatable anchoring element is rotatable by the tool.

According to some embodiments of the present disclosure, the tool receiving shape comprises a slot sized to receive a tip of a screwdriver.

According to an aspect of some embodiments of the present disclosure, there is provided a fixture mounting adaptor for insertion to a mounting slot of a track of a track lighting system, the mounting slot having an entrance aperture with a width less than 8 mm across, wherein the mounting adaptor comprises: a housing having a width sized for insertion into the mounting slot via the entrance aperture, wherein the housing comprises two opposite walls of the housing, and a wall aperture in each wall; and a rotatable anchoring element extending within the housing between the two wall apertures; wherein the rotatable anchoring element is held to the housing by interference with the two opposite walls surrounding the two wall apertures.

According to some embodiments of the present disclosure, a respective pin extends from a perimeter of each wall aperture into an interior of each wall aperture; and the rotatable anchoring element is held to the housing by interference with the pins.

According to some embodiments of the present disclosure, the rotatable anchoring element comprises at least one pin track, and each pin slides along the at least one pin track when the rotatable anchoring element rotates.

According to some embodiments of the present disclosure, the rotatable anchoring element is rotatable to extend in the direction of the width of the housing to a first extent less than the entrance aperture width, or a second extent greater than the entrance aperture width.

According to some embodiments of the present disclosure, the rotatable anchoring element comprises a central pin which is received by a socket in a third wall of the housing.

According to some embodiments of the present disclosure, the housing comprises two fitted shells which respectively comprise the two opposite walls, and the rotatable anchoring element is assembled to the housing by pressing between the two shells.

According to some embodiments of the present disclosure, the fixture mounting adaptor includes the track, wherein the track comprises a recessed region into which the rotatable anchoring element extends to anchor the fixture mounting adaptor, when the fixture mounting adaptor is inserted to the mounting slot.

According to an aspect of some embodiments of the present disclosure, there is provided a fixture mounting adaptor for insertion to a mounting slot of a track of a track lighting system, the mounting slot having an entrance aperture with a width less than 8 mm across, wherein the mounting adaptor comprises: a housing having a width sized for insertion into the mounting slot via the entrance aperture; a rotating anchoring element held at least partially within the housing, and configured to rotate from a collapsed insertion position to an anchoring position extending wider than the entrance aperture upon insertion of the housing to the mounting slot.

According to some embodiments of the present disclosure, the rotating anchoring element comprises magnetically attracted material, and rotation into the anchoring position is due to magnetic attraction of the rotating anchoring element to a portion of the track.

According to some embodiments of the present disclosure, the fixture mounting adaptor includes the track, wherein the track comprises a recessed region into which the rotatable anchoring element extends to anchor the fixture mounting adaptor, when the fixture mounting adaptor is inserted to the mounting slot.

According to an aspect of some embodiments of the present disclosure, there is provided components of a track lighting system comprising: a fixture mounting adaptor and a track having a mounting slot defined by interior walls of the track between which the fixture mounting adaptor is insertable, the interior walls being separated at least at an entrance aperture by 8 mm or less; wherein the track includes an interior recessed region recessed from the walls of the mounting slot on either side of the mounting slot, the recessed region also extending longitudinally along the slot; wherein the fixture mounting adaptor comprises a rotatable anchoring element positioned to be aligned with and mounted to be rotatable to insert into the interior recessed region when the fixture mounting adaptor is fully inserted into the mounting slot.

According to some embodiments of the present disclosure, the fixture mounting adaptor comprises a housing, and the rotatable anchoring element is rotatably held in position by interference with the walls of the housing.

According to some embodiments of the present disclosure, the rotatable anchoring element is rotatable from a position extending across a width smaller than the width of the entrance aperture, to a position extending across a width greater than the width of the entrance aperture.

According to some embodiments of the present disclosure, the track comprises power rails extending longitudinally along the interior walls of the track, and wherein the recessed region is positioned between the entrance aperture of the mounting slot and the power rails.

According to an aspect of some embodiments of the present invention, there is provided a method of mounting a fixture to a track lighting track, the fixture including a magnetic mounting module attached to a fixture mounting adaptor with a deployable anchoring element, the method comprising: pushing the fixture mounting adaptor into a slot defined by a slot aperture of the track lighting track, thereby bringing the magnetic mounting module to magnetically engage a magnetically attracted material of the track lighting track, and thereby positioning the undeployed anchoring element inside the slot; releasing the fixture, allowing the weight of the fixture to be substantially supported by the magnetic engagement of the magnetic mounting module; and then deploying the anchoring element to engage across the slot so that the fixture mounting adaptor is geometrically prevented from being pulled from the slot.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example, and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
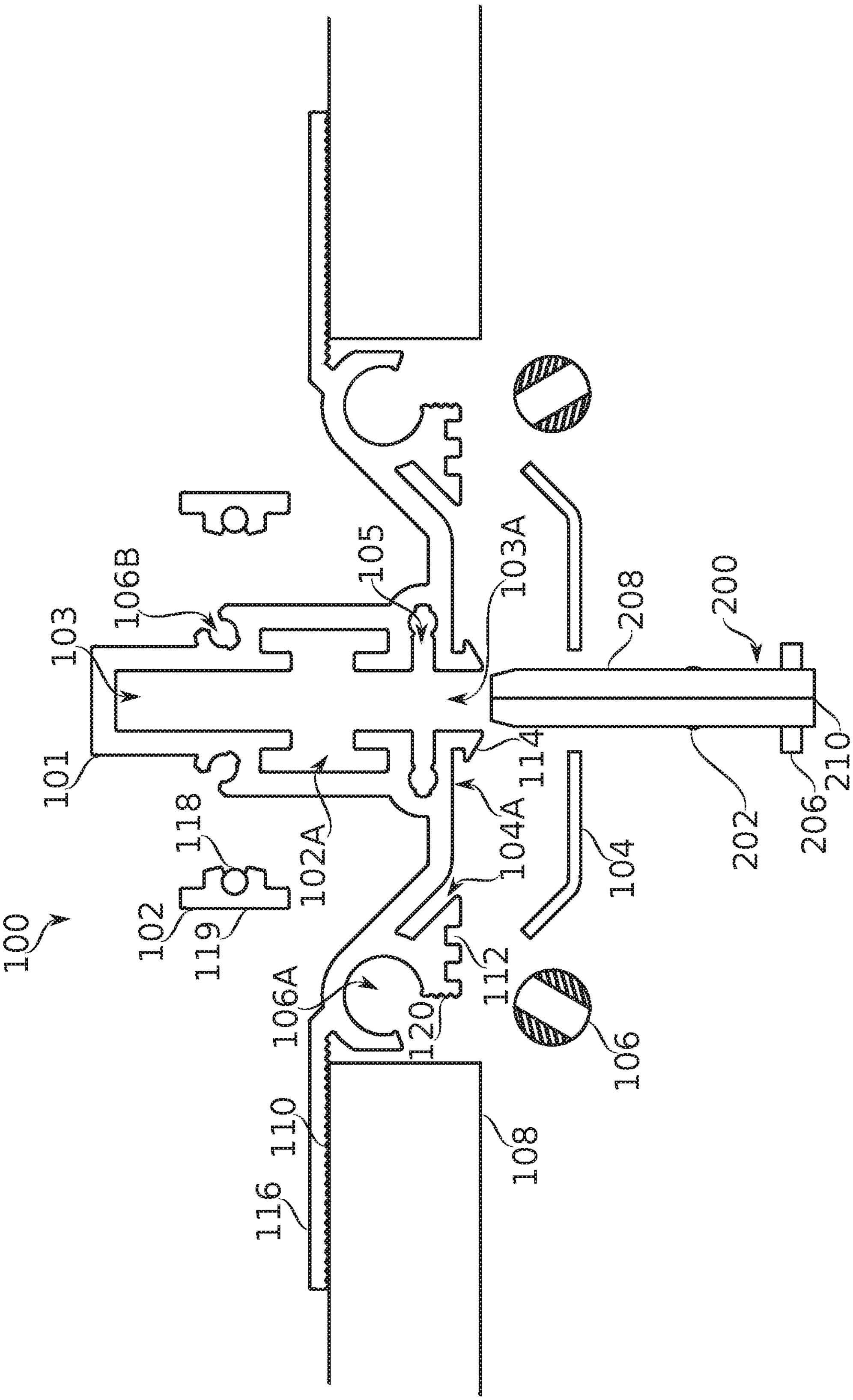
FIG. 1A illustrates a schematically represented cross-section of a track lighting track assembly and luminaire mounting adaptor in partially exploded view, according to some embodiments of the present disclosure.

The present invention, in some embodiments thereof, relates to the field of artificial illumination systems, and more particularly, to track lighting systems.

Overview

A broad aspect of some embodiments of the invention relates to the secure mounting of a track lighting fixture to a track, wherein the mounting mechanisms involved are to have a low impact on the aesthetic appearance of the mounted fixture and/or track. In some embodiments, the aspect relates to secondary mounting support mechanisms that optionally act as a safety backup for a primary mounting mechanism.

PCT International Patent Application No. IL2016/050190 (filed Feb. 17, 2016) describes track lighting systems that optionally maintain a low visual profile by the use of a track slot having a thin power adaptor entrance aperture (for example, an entrance aperture having a width of 8 mm, 5 mm, 3 mm or less). In some embodiments, primary mechanical support is provided by an arrangement of magnetically attracted materials (such as magnets on the mounted luminaire, and ferromagnetic material in the track). Optionally, these materials are provided in a configuration that allows secure mounting even though the magnetic material may itself be hidden from view (e.g., the magnetic mounting material is optionally contained within a housing, and/or encased and/or disguised by a surfacing material).

Although magnetic mounting potentially provides stable mounting and/or positioning for as long as the magnetism retains its strength, there is some associated safety risk if magnetic strength degrades. For example, strong heating (e.g., due to fire) may potentially weaken or destroy magnetic properties of some otherwise "permanently" magnetic materials. Other, more slowly developing degradation of the magnetic properties of permanent magnets may occur; for example, due to corrosion (for example, if a protective jacket of a rare earth magnet is damaged), effects of other nearby magnetic fields, and potentially the passage of time itself.

In some embodiments of the current invention, one or more secondary mechanisms of providing mechanical support are provided. With respect to usage of the phrases "primary mechanical support", "secondary mechanical support" and like terminology, it is meant that most stabilization of a fixture (e.g., against weight and/or other forces exerted which tend to disturb the stationary attachment of a fixture to a track) is ordinarily provided by some primary mechanical support mechanism; while the secondary mechanical support becomes substantially weight bearing only after support by the primary support mechanism is overloaded or even overcome. Optionally, qualities of secondary mechanical support are in some respects distinct from qualities of primary mechanical support. For example, secondary mechanical support optionally permits relatively more wobble and/or sliding, optionally while also being relatively more resistant to complete detachment (removal) of a fixture from a track. In some embodiments, the rated load bearing capacity of primary mechanical support (assuming that this rating accounts for an appropriate safety factor of, for example, about 5×) is, for example, about 0.5 kg, 1 kg, 1.5 kg, 2 kg, or another larger, smaller, or intermediate load bearing capacity. Optionally, activated secondary mechanical support is rated for at least the same weight; optionally including the same or a larger safety factor of, for example, about 5×, 10×, 20×, or another larger, smaller, or intermediate safety factor. In some embodiments, a secondary mechanical support mechanism provides safety by having a relatively lower susceptibility to failure under conditions (e.g., of temperature, corrosiveness, and/or time) potentially correlated with increased failure of a mechanism of primary mechanical support.

In some embodiments, elements implementing a secondary mechanism of mechanical support are confined to parts of the overall fixture construction which are hidden from view after installation; for example, located within the volume of the track slot. Moreover, in some embodiments, secondary mechanisms of providing mechanical support are preferably implemented on adaptor parts specialized for use with the track system. The adapter parts are optionally configured in turn to permit attachment of add-on hardware (comprising, e.g., luminaires available on the market). This optionally allows the use of add-on hardware that is not necessarily specifically designed and/or modified for use with the track lighting system. It is a potential advantage for the mounting/adaptor parts of a track lighting system to avoid interfering with the aesthetics of add-on hardware (e.g., by being hidden, and/or by presenting a plain and/or unobtrusive appearance for visible parts).

Accordingly, there are potentially one or more motivations to hide, disguise, remove, and/or visually simplify parts relating to utilitarian functions such as mechanical support. Herein, such hiding, disguising, removing, visually simplifying and the like are considered aspects of designing for mechanical support having a "low visual profile". Designing for a low visual profile also potentially places constraints on how a mechanical support mechanism may be activated to prevent removal of a fixture, and how it may be deactivated to allow removal of a fixture. Optionally low visual profile design encompasses the design of parts including controls for activating/deactivating these functions; including, for example, buttons knobs, handles, and the like.

In some embodiments, simplification of control itself is optionally adopted as an aspect of mechanical support design. International Patent Application No. IL2016/050190 (filed Feb. 17, 2016) teaches, for example, the use of retaining heads (e.g. FIG. 4G) that are shaped to engage a ledge inside a clip receiving space.

Pressing the retaining head into place activates the lock. For retrieval, the retaining heads are optionally shaped with an incline on the trailing edge, so that with sufficient pulling force during removal, the interaction of the incline with one or more edges (such as a ledge) within the clip receiving space forces the retaining head back into alignment with slot. So-aligned, the retaining head can be removed. This optionally reduces securing upon insertion and detachment allowing removal to actions activated by simple push-pull installation.

An aspect of some embodiments of the current invention relates to narrow-slot track housings comprising a slot housing and two mounting wings extending laterally therefrom, the wings extend directly from a ventral (slotted) face of the slot housing.

In some embodiments of the invention, a narrow slot aperture (e.g., 8 mm or less; for example, 5 mm, 3 mm, 2 mm, or another width) is laterally surrounded on each side by a sufficient extent of supporting surface to support magnetic attraction between a mounted fixture and magnetically attracted elements of the track. In some embodiments of the invention, part of this supporting surface is provided and/or supported by mounting wings that extend from a housing surface that is substantially contiguous with the slotted face of the slot housing. In some embodiments, the surface of the housing itself is slightly recessed, and provided with anchoring structures to receive a magnetically attracted material, for example steel strips that provide the direct supporting surface; optionally, the magnetically attracted material is coated in turn (for example, upon installation) to provide the supporting surface to which the mounted fixture is magnetically held.

Optionally, moving part of the fixture supporting surface to the mounting wings allows the slot housing itself to be narrower than the extent of the fixture supporting surface. This potentially reduces the amount of material needed to produce the track housing (for example, to produce it as an extruded rail of aluminum). In some embodiments, the mounting wings also provide a second mounting surface (lateral to the fixture mounting surface), in the form of flanges dorsally recessed from the slotted face, to an extent that accommodates the thickness of standard wall- and/or ceiling-board. This potentially positions the slotted face about flush with the exposed wall/ceiling board. Optionally, the mounting wings are shaped to include other functions, for example, slots and/or apertures for receiving mounting hardware and/or alignment hardware.

An aspect of some embodiments of the current invention relates to the positioning of a receiving space for a fixture retaining anchor near a slotted face of a track housing. In some embodiments, a track lighting track's slot housing defines a narrow slot aperture (for example, 8 mm or less) in a slotted wall (the ventral wall) of the slot housing. Optionally, a region within the slot, and defined on the interior side of the slotted wall, comprises a widening of the slot. In some embodiments, a mounting adaptor includes a laterally expandable anchoring element that moves and/or is movable, upon or after insertion of the mounting adaptor to the slot, from a narrow configuration suitable for insertion through the slot aperture to a widened configuration. In the widened configuration, in some embodiments, the anchor inserts into the widened region of the slot defined on the interior side of the slotted wall. In some embodiments the widened anchor prevents direct removal of the mounting adaptor from the slot, but does not lock the mounting adaptor in place longitudinally. This provides a potential advantage for allowing the mounting adaptor to be repositioned, while still adding a safety factor that prevents the mounting adaptor from falling out of the slot housing. This anchoring is a potential advantage for increasing the safety of a magnetic mounting, where the magnet provides primary holding and stabilization force, but could be prone to failure in unusual circumstances (fire, earthquake, or demagnetization due to age and/or corrosion, for example).

An aspect of some embodiments of the current invention relates to providing additional alignment features to a slotted track housing to help align adjacent track segments to one another. In some embodiments, alignment features are provided as slots on either side of the slotted track housing, sized to receive and retain alignment pins protruding from the longitudinal track housing end. By mating tracks from laterally positioned pins, the potential advantage is provided of the mounting track slot remaining clear of obstructions—and thus available for the positioning of mounted fixtures.

An aspect of some embodiments of the current invention relates to the electrical interconnection of track lighting track sections. In some embodiments, track sections include electrical power rails accessed from within the mounting slot of the track. In some embodiments, track inserts comprise housings sized to be fittingly inserted into the mounting slot, along with electrical contact assemblies that can be positioned to span the juncture between track sections, and transmit power therebetween. Optionally, two separate insert contacts are electrically interconnected to join two sections together as one electrically continuous rail. Optionally, one contact extends longitudinally sufficient to reach between the two sections to form one electrically continuous rail. In some embodiments, section interconnection inserts are optionally configured to serve (additionally or alternatively) as fixture mounting adaptors—comprising pairs of section interconnecting electrical contacts, as well as power leads configured to connect to a track-powered module (e.g., a luminaire).

An aspect of some embodiments of the current invention relates to mechanical support of a track lighting fixture based on use of a rotatable anchor element that fully deploys to a laterally expanded position that interferes with a ledge or recess of a track lighting track to resist removal of the fixture from a track, without preventing sliding along the track.

In some embodiments of the invention, mechanical interference between a rotatable anchoring element of a fixture and a ledge and/or recess of a track lighting track slot provides mechanical support to the fixture. Optionally, the support provided by the rotatable anchor element comprises secondary mechanical support. In some embodiments, the rotatable anchor element is sized so that, when deployed, it interacts with the ledge and/or recess to prevent complete detachment (removal) of the fixture from the track. Thus, for example, the rotatable anchoring element optionally prevents a fixture from simply falling out of its slot if a primary support mechanism is disabled and/or overcome. In this respect, a rotatable anchor element provides a potential advantage (compared, for example, to a tabbed retaining head) by being less limited in the lateral extent that can be provided to engage a retaining recess and/or ledge of a track, since "extra width" can be stowed oriented in the longitudinal direction during insertion. This is potentially of further advantage if mounting requirements demand extra assurance that accidental dismounting of fixtures from their installed position is mechanically prevented.

However, the deployed rotatable anchoring element optionally does not prevent movement in other degrees of freedom. For example, the anchoring element is optionally sized relative to the track recess it contacts so that it does not prevent sliding movement longitudinally along the track. Optionally, the deployed rotatable anchoring element also does not prevent motions of the fixture within the slot such as rocking or wobbling.

A detachment-preventing anchoring device which nevertheless does not prevent freedom of fixture repositioning provides a potential advantage for manipulation and/or positioning of the fixture that, in some embodiments, may sometimes be moved in the slot by the use of a reach extending tool mounted on a pole. The strength of the anchoring device potentially prevents complete detachment of the device from the track even if somewhat excessive force is accidentally exerted on the fixture during manipulation. At the same time, "sticking" in place during motion along the track is potentially prevented.

An aspect of some embodiments of the current invention relates to mechanical support of a track lighting fixture based on controlled deployment and/or undeployment of a rotatable anchor element.

In some embodiments of the invention, mechanical interference between a rotatable anchor element of a fixture and a ledge and/or recess of a track lighting track slot provides mechanical support to the fixture. Optionally, the rotatable anchor element is activated as an integral consequence of the action of insertion of a mounting adaptor to a receiving slot of a track lighting system. Optionally, the rotatable anchor element is configured to be detached easily upon execution of an intentional action, while remaining resistant to accidental detachment, for example due to application of direct force in a direction of detachment from the track.

In some embodiments of the current invention, one or more rotatable anchoring elements are provided that are mechanically biased to rotate and laterally expand into place (deploy) once they reach their target installation position. In some embodiments, this biasing is imposed by a tensioning member such as a spring. Optionally, the tensioning member is pre-tensioned before insertion of the anchoring element into position, for example, by winding, unwinding, compressing, and/or stretching a spring.

Optionally, the tensioning member is tensioned by the act of inserting the mounting adaptor into the slot that receives it. For example, in some embodiments, a laterally extending tab is squeezed, compressing a spring that is coupled to the anchoring element so that it drives its rotation. In another example, a shaft extending from the top of the mounting adaptor is pressed down upon encountering the upper wall of the track slot. This stores energy in (e.g., compresses) a tensioning member that in turn drives rotation of the rotatable anchoring element once it reaches its release point. In some embodiments, tensioning comprises direct pressure on the anchoring element itself—for example, the anchoring element is shaped so that when it approaches the slot at a certain angle, it tends to collapse upon pressing against the slot entrance, then remains collapsed (e.g. held by the slot walls) until the adaptor is fully inserted and the anchoring element can expand again into its receiving recess.

In some embodiments, a tensioning member is avoided by arranging components so that a mechanical movement (e.g., of a shaft or tab) caused by insertion of the adaptor to the slot directly presses on the anchoring element to rotate it. However, this potentially requires extra care in the coordination of the movement that activates rotation, and/or the position of the rotatable anchoring element in the slot when the movement occurs. Potentially, a tensioning member that temporarily stores energy received before rotation occurs provides an advantage by reducing a requirement for such coordination.

In some embodiments, a force causing anchoring element deployment (optionally, but not necessarily, rotational deployment) comprises magnetic attraction. Optionally, the magnetic attraction is between the anchoring element and ferromagnetic elements of the track to which it is installed. Optionally, a magnetic and/or ferromagnetic material is brought near to the anchoring element (for example, from outside the track) once it is in position to release and/or deploy it.

In some embodiments, deployment is activated by a detachable member that initially extends beyond the track slot upon mounting. For example, a string or other extended member is provided that pulls the anchoring element into position when it is itself pulled on. In some embodiments, activation comprises release; for example: removal of a piece of tape or other blocker that prevents a deployment-biased anchoring element from expanding until the tape or other blocker is removed from its blocking position.

A potential advantage of these mechanisms, and particularly of mechanisms that are activated by the act itself of insertion of an adaptor to a track slot, is in use for installation into high ceilings at the end of a pusher rod, optionally without creating a need to scale a high ladder, erect scaffolding, or otherwise create potential risk of falling to an installer. The more actions in addition to pushing the fixture into place that are required, the more difficult installation potentially becomes.

Deactivation of an anchoring element, in some embodiments, is optional—the fixture is optionally considered permanently installed along its rail once it is put into place, even though it can continue to be moved along the rail itself. Preferably, however, the fixture is removable from the track by one or more methods of un-deploying (e.g., rotatingly collapsing) the anchoring element.

In some embodiments, a portion along the length of the recess/ledge into which/over which an anchoring element deploys is blocked. Collapse of the anchor is achieved by bringing the fixture close enough along the length of the track that this block is encountered by the anchor, causing it to rotate back into its non-deployed position. Once sufficiently collapsed, the mechanical support of the anchor is deactivated, and it potentially becomes possible to extract the fixture from the slot. Optionally, the block is built into the track, and/or permanently installed when the track is installed. Optionally, the block is provided as part of a special tool (which may itself be a type of fixture) that inserts to the track to allow removal of other fixtures.

Additionally or alternatively, a tool is provided having a portion that inserts to the track slot in the region of the anchoring recess/ledge, and can be slid along it (e.g., by manipulating a handle of the tool) until it reaches the anchoring element, presses against it, and collapses it.

In some embodiments, collapse of the anchoring element is achieved by direct manipulation of the fixture. For example, pressing a mounting adaptor of a fixture further into a slot optionally presses on a member of the mounting adaptor (such as a tab or shaft) that in turn interacts with the anchoring element to collapse it (e.g., by rotation). With, for example, an appropriate re-orientation (e.g., tilting forward or backward) of the mounting adaptor within the slot, the collapsed anchoring element is optionally trapped in its collapsed position by pressing from the slot walls on at least one side of the recess. The trapping prevents the anchoring element from expanding again as it is pulled outward, allowing the mounting adaptor and fixture to be removed from the slot.

Herein, the term "fixture" is used for any device which at least partially inserts to a slot of a track lighting track to provide a service function (optionally, an electrically powered service function) such as illumination. The term "luminaire" may be used to indicate an illuminating fixture, or, where reference is clearly made to a luminaire as part of a fixture, to a subassembly of the fixture that is operated to provide illumination.

In some embodiments, a fixture comprises, for example: a sensing module, a speaker module, a network connection module (optionally, wireless), or another module compatible with the power delivery capacity of the rails of a track.

Examples of sensing modules include, for example, cameras, motion sensors, and/or environmental condition sensors (e.g. temperature, humidity, and/or ambient light). Examples of wireless connection modules include, for example, modules for radio, optical, sound, infrared and/or electromagnetic induction-based communication. Optionally, any standard or non-standard public or proprietary connection protocol supported. Such protocols may include, for example: Z-Wave®, Bluetooth®, and/or a wireless or other standard in the IEEE 802 family, such as Wi-Fi® (IEEE 802.11), ZigBee® (IEEE 802.15) or another limited area network protocol.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Figure 1B:
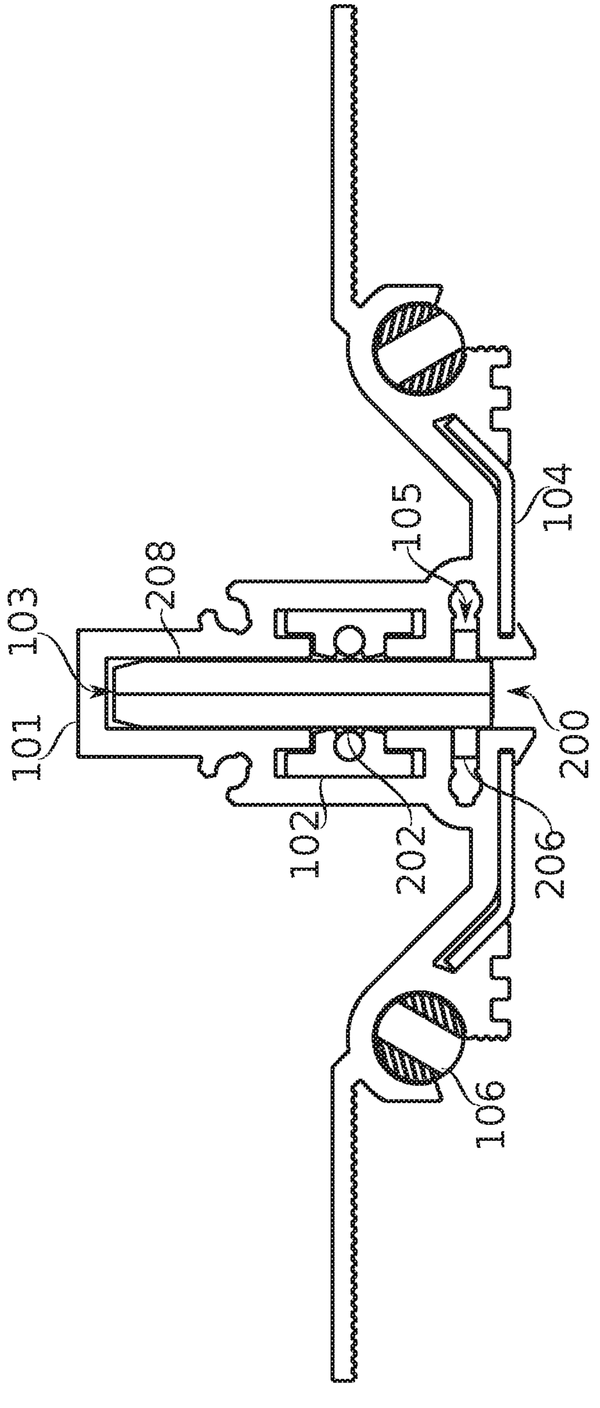
FIG. 1B illustrates a schematically represented cross-section of track lighting track assembly and luminaire mounting adaptor in assembled view, according to some embodiments of the present disclosure.

Reference is now made to FIG. 1A, which is a schematically represented cross-section of a track lighting track assembly 100 and luminaire mounting adaptor 200 in partially exploded view, according to some embodiments of the present disclosure. Reference is also made to FIG. 1B, which is a schematically represented cross-section of track lighting track assembly 100 and luminaire mounting adaptor 200 in assembled view, according to some embodiments of the present disclosure. Further reference is also made to FIG. 1D, which is a schematically represented cross-section of track lighting track assembly 100 including annotated examples of feature measurements in millimeters, according to some embodiments of the present disclosure. It should be understood that these measurements are provided as examples, and are not limiting.

In some embodiments of the invention, track 100 of a track lighting system comprises track housing 101. Optionally, track housing 101 comprises an extruded aluminum manufacture; for example, a single piece of aluminum with a cross-section such as the on illustrated, and extending for about 1 m, 2 m, 3 m, or another larger, smaller, or intermediate length. In some embodiments, track housing 101 comprises an interior region 103 formed as a slot open through slot access aperture 103A in a ventral side of the track 100 (the ventral side being considered as the side of the track 100 facing the exposed mounting surface 108A shown in FIG. 1C).

In some embodiments, the walls of slot 103 comprise surfaces defining one or more receiving spaces 102A for one or more contact assemblies 102 carrying power rails 118 for bringing power to contacts 202. For example, the track 100 comprises two contact assemblies 102, each carrying at least one power rail 118, optionally secured within by a mounting rail 119. It is a potential advantage to use just two power rails 118 along each length of track, which potentially keeps use of copper low (for less expense and/or less weight). In some embodiments, flexibility of insertion (allowable insertion in either orientation, even for powered circuitry elements such as LEDs which potentially require a definite electrical polarity) is maintained by providing a polarity switching function within a mounting adaptor 200 used to attach the powered module to the track, or on the powered module itself.

Optionally, mounting rail 119 is comprised of an insulating polymer, for example, polycarbonate. Optionally, power rail 118 comprises an electrically conducting material such as copper and/or a copper alloy.

A narrow slot 103 is provided in some embodiments of the invention, for example, a slot having a width in the range of 1-8 mm; more particularly, about 5 mm, about 3 mm, about 1 mm; or another larger, smaller, and/or intermediate value. Slots of this narrowness are a potential advantage for allowing the appearance of a space to be designed for flexible positioning of lighting with lowered impact on appearance by the lighting infrastructure itself. Apart from being visually thinner, a narrower slot potentially reduces the deepest extent of shadowing visible at most view angles.

In some embodiments, one or more mounting adaptors 200 are provided, having a housing 208 with a width sized to fittingly insert into slot 103; and configured for transferring power from contacts 202 to power outlets 210. In some embodiments of the invention, track housing 101 comprises a recess 105 that is shaped and positioned to receive anchoring element 206, upon insertion of mounting adaptor 200 to slot 103. In some embodiments, anchoring element 206 acts as a safety backup for another mounting mechanisms, such as a magnetic mounting mechanism. Optionally, anchoring element 206 is strong enough to support the weight of mounting adaptor 200 and any attached hardware. However, as a backup, anchoring element 206 does not need to be sufficiently well fitted to tightly affix mounting adaptor 200 to a particular position on the track, either along it (in a longitudinal direction), or in the direction of insertion. Optionally, a small amount of movement is optionally allowed in any direction so long as the interaction of anchoring element 206 and recess 105 is the only mechanism preventing extraction of mounting adaptor 200 from slot 103—however, normally, a firmer primary mounting mechanism such as magnetic mounting is also provided.

In some embodiments of the invention, track 100 comprises one or more mounting strips 104; the mounting strips 104 being formed, for example, as plates that extend through receiving slots 104A of the track 100. In some embodiments of the invention, mounting strip 104 comprises a magnetically attracted material such as steel or another iron alloy. Optionally, the inserted mounting strip 104 is itself magnetized (e.g., as permanent magnet). In some embodiments, track housing 101 itself comprises a magnetically attracted and/or magnetized material. However, it is a potential advantage to provide mounting strips 104 as insertable pieces separate from track housing 101, to allow taking advantage of technologies of manufacture using non-magnetic materials (for example aluminum extrusion) in the formation of the profile of the track body.

It is to be understood that mounting strips 104 are optionally provided in different variations of construction consistent with the provision of sufficient magnetically susceptible material, positioned to allow reliable support of the weight of a mounted luminaire 150. Optionally, mounting strips 104 incorporate other functionality. For example, in some embodiments, mounting strips 104 include construction features for securing to the track housing 101, and/or related to installation of the track 100.

In some embodiments, track housing 101 includes one or more mounting element slots 104A shaped to receive at least a portion of the mounting strip 104, for positioning and/or securing of the mounting strip 104 to the track housing 101. For fitting to slots 104A, for example, mounting element 104 optionally comprises an angle bend along a longitudinal axis of the track 100. During assembly, mounting strip 104 optionally inserts into one side of the slots 104A and slides along the track housing 101. In this example, slots 104A are positioned such that the resulting assembly positions a portion of mounting strip 104 on an outermost surface of the track 100, at and/or close to luminaire mounting surface 108A. This is a potential advantage for providing increased strength and/or reduced magnetic material requirements for mounting. However, in some embodiments, a mounting element is held entirely within a track housing.

In some embodiments, track housing 101 comprises one or more alignment channels 106A, sized to receive alignment pins 106 (optionally alignment pins 106 comprise threaded screws and/or bolts; optionally, alignment pins 106 are used in a set-screw system, for example as described in relation to FIGS. 11A-11E). In some embodiments, alignment pins 106 extend between two adjacently installed segments of track, aligning and/or attaching them. In some embodiments, the length of a single segment of track is in the range of about 1-3 meters (e.g., standard sizes of 1, 2, or 3 meters). Optionally, single segments are cut to shorter and/or intermediate lengths as appropriate for the individual installation. While shorter track lengths may be easier to manufacture individually (e.g., offering less resistance to the sliding insertion of contact assemblies 102 through receiving spaces 102A); longer track lengths provide a potential advantage by reducing the number of assembly steps needed per unit of track length overall. In some embodiments of the invention, recesses 106B are available to receive alignment pins (providing a potential advantage, for example, of stiffening joints between track sections).

Figure 1C:
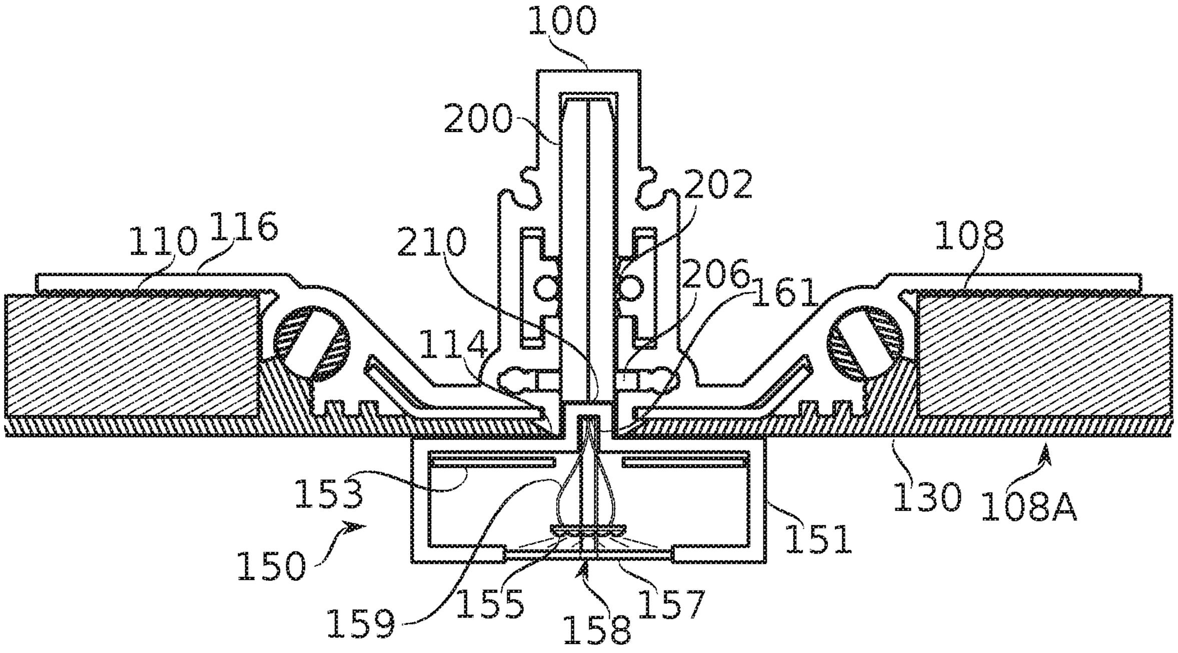
FIG. 1C illustrates a schematically represented cross-section of track lighting track assembly and luminaire mounting adaptor assembled together with an example of a luminaire, according to some embodiments of the present disclosure.

Reference is now made to FIG. 1C, which is a schematically represented cross-section of track lighting track assembly 100 and luminaire mounting adaptor 200 assembled together with an example of a luminaire 150, according to some embodiments of the present disclosure.

In some embodiments, track 100 comprises flanges 116 that are spaced back from the ventral side of the track 100 to allow flush or nearly flush mounting with, for example, a standard thickness of mounting board 108 such as wallboard, ceiling board, or another other mounting used in an architectural space (for example, a hall, room, courtyard or other space defined indoors or outdoors by a building). Such a standard thickness is, for example, about 6.4 mm, 7.9 mm, 9.5 mm, 12.7 mm, 15.9 mm, 19.0 mm, 25.4 mm, another thickness of within about 5-30 mm, 10-30 mm, 15-30 mm, or another greater or lesser thickness. In some embodiments, a portion of the ventral face of the track is provided with surface irregularities 110, for example, ridges (as shown), or another irregularity such as divots, bumps, or perforations (spaced, for example, at regular or irregular intervals of about 1-10 mm, or another greater, lesser, or intermediate interval). Potentially, surface irregularities 110 help to improve stability of mounting. Surface irregularities 112, 120 optionally provide surfaces textured to promote stable attachment of surface treatments such as plaster. In some embodiments, the form of track housing 201 is provided with one or more installation features such as brackets, holes, slots, or other forms that can be attached to by mounting hardware and/or surfaces.

In some embodiments, a protruding member 114 is provided at slot access aperture 103A. The slightly protruding profile of protruding member 114, potentially acts as a stop when a luminaire or other module is mounted to the track 100. This may act as partial protection of surfacing material 130 (shown in FIG. 1C) against taking the full compressive load of a magnetically mounted module. Protruding member 114 may also serve as a guide to protect slot 103 from infilling with surfacing material 130; for example, when it is applied during installation. Surfacing material 130 is optionally used when installing track 100 to visually blend the track with the surrounding mounting surface (e.g., the ventral surface of wall- or ceiling board 108). Surfacing material 130 comprises, for example, spackling paste and/or paint.

In some embodiments, luminaire 150 comprises a housing 151. The housing 151 may include an illumination module 155, electrically connected (e.g., via wiring 159) to power outlets 210 of the adaptor module 200. Optionally, a light diffuser 157 is provided. In some embodiments, connection comprises the use of one or more metallic screws 161. Optionally or additionally, screws 161 mechanically secure luminaire 150 to the adaptor module 200. Optionally, an adaptor module 200 is unpowered (e.g., provided without contacts 202). Such an unpowered adaptor module 200 is optionally used to provide mechanical support only.

In some embodiments, a portion of the weight of luminaire 150 and/or contact assembly 200 are transferred to the track 100 via magnetic attraction between magnetic and/or magnetically attracted elements 153 and mounting strips 104. In some embodiments, a luminaire is provided with one or more permanent magnets 153 (for example, rare earth magnets, or more particularly, neodymium-alloy magnets), while mounting strips 104 comprise a magnetically attracted material such as steel. Alternatively or additionally, the positioning of magnetic and magnetically attracted elements is reversed. Optionally, both materials are magnetic.

In some embodiments, luminaire 150 is configured to allow access to a control member (e.g., tool receiving shape 315, FIG. 3C) of rotatable anchor element 206, for example via an access channel 158. Additionally or alternatively, luminaire 150 is removably attached to adaptor module 200 (for example, snap-attached). Additionally or alternatively, a mechanical linkage (for example, a stiff cable) connects between rotatable anchor element 206 and a surface of luminaire 150 to which a control member (for example a knob or tool receiving shape) is mounted. In some embodiments, luminaire 150 is attached to adaptor module 200 in a position offset from rotating anchoring element 206 where it does not interfere with access to the control member.

Figure 1D:
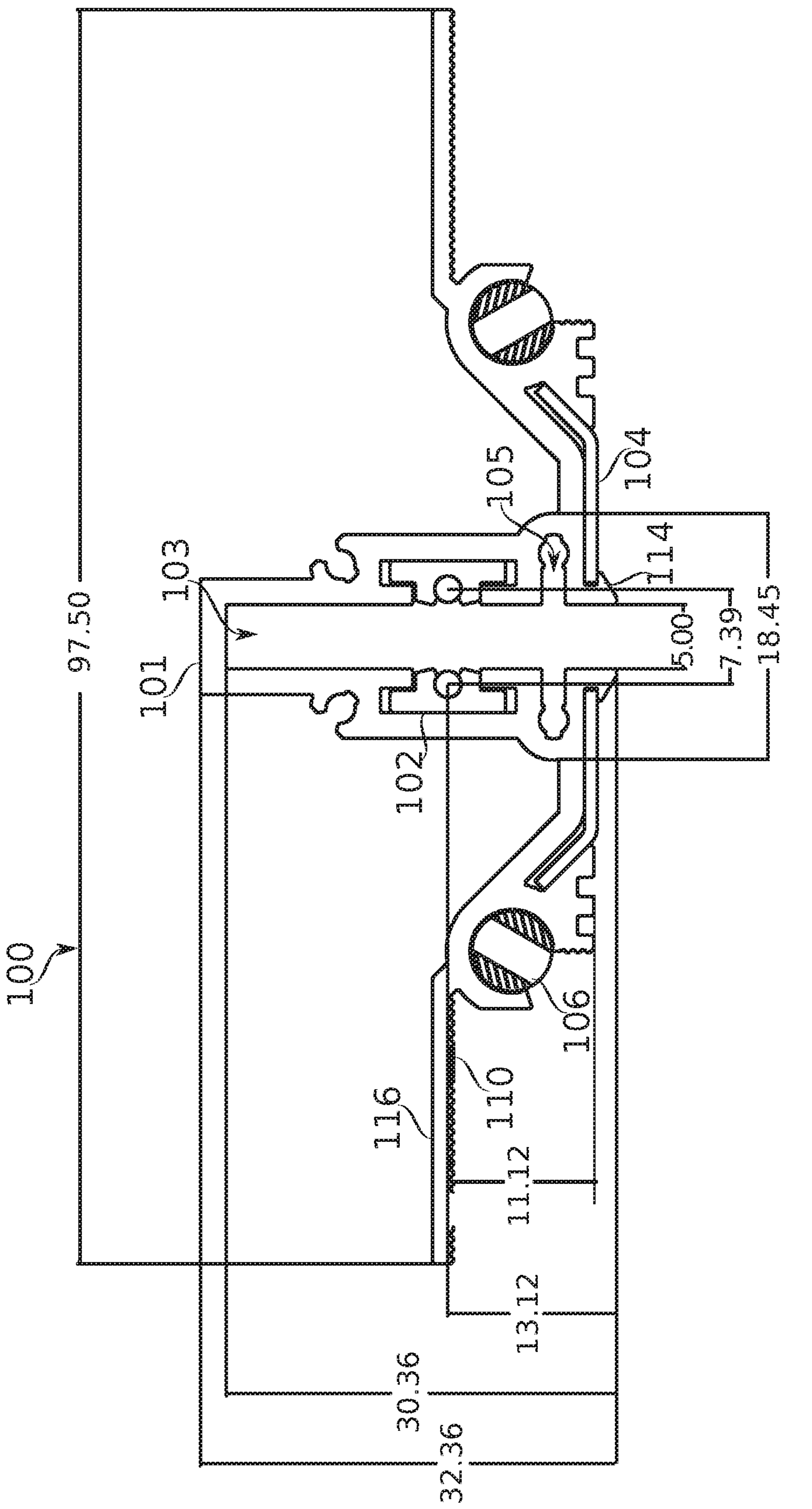
FIG. 1D illustrates a schematically represented cross-section of track lighting track assembly including annotated examples of feature measurements in millimeters, according to some embodiments of the present disclosure.
Figure 1E:
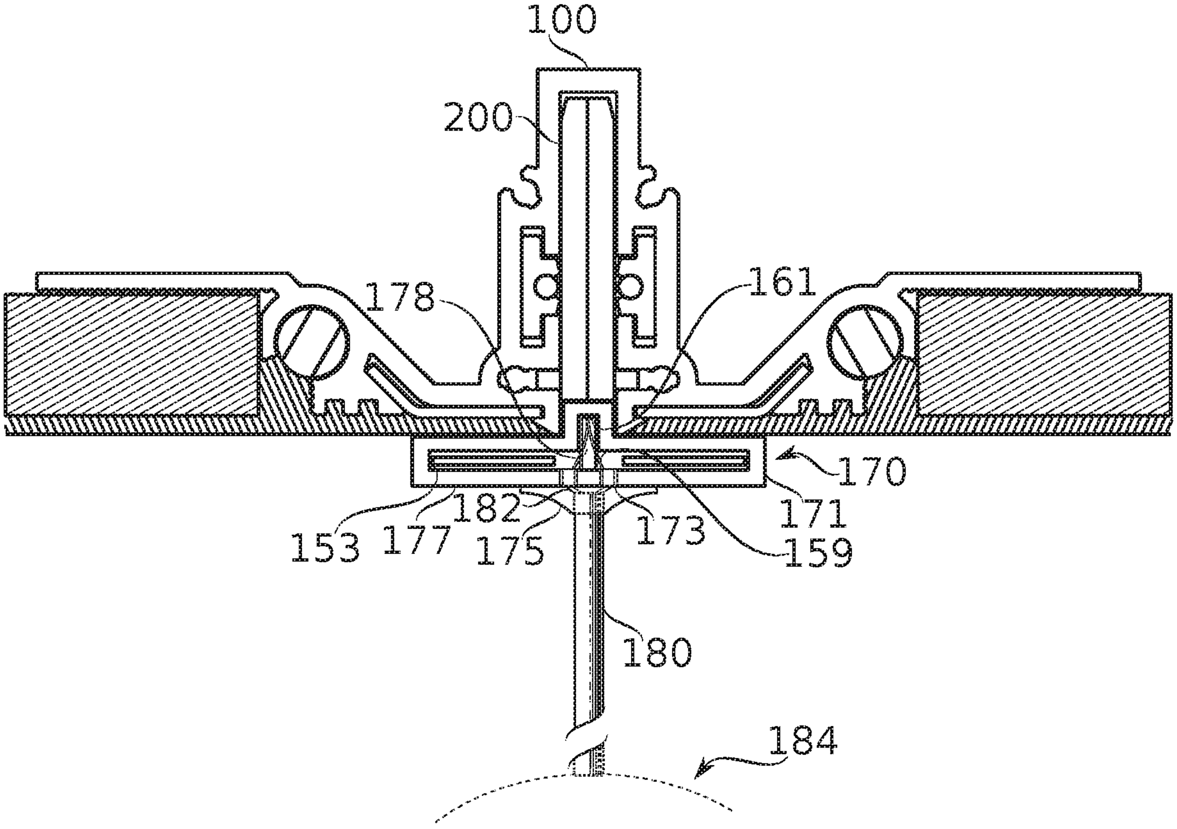
FIG. 1E schematically illustrates a mounting module, according to some embodiments of the present disclosure.

Reference is now made to FIG. 1E, which schematically illustrates a mounting module 170, according to some embodiments of the present disclosure.

In some embodiments, mounting module 170 (secured to mounting adaptor 200, e.g., via screws 161) comprises a housing 171 that is sized to contain magnetic and/or magnetically attracted element 153 (for magnetic support from the track 100), and otherwise is configured for attachment to a further suspended or otherwise externally attached element 180 that may comprise, for example, a cable or rod. The mounted device 184 to which element 180 is in turn optionally attached may be any suitable powered or unpowered device, for example, a luminaire. Optionally, attached element 180 comprises electrical conductors 182 that may be electrically interconnected with the track lighting system (e.g., via connectors 173 and/or wires 159) to receive track power. Optionally cable 180 is connected only mechanically to receive weight support from the track installation. Optionally, a fairing 175 is provided to shield the interconnection region from view. This configuration is a potential advantage for generically allowing interconnection of the track lighting system with suspended luminaires exposing bare wire ends. Additionally or alternatively, a surface of mounting module 170, or example, surface 177, is provided with mounting holes (pre-made and/or drilled as part of installation) for attachment of an external luminaire and/or other device.

In some embodiments, mounting module 170 is configured to allow access to a control member (e.g., tool receiving shape 315, FIG. 3C) of rotatable anchor element 206, for example via an access channel 178, and/or by another means and/or method, for example as described in relation to luminaire 150.

Figure 13A:
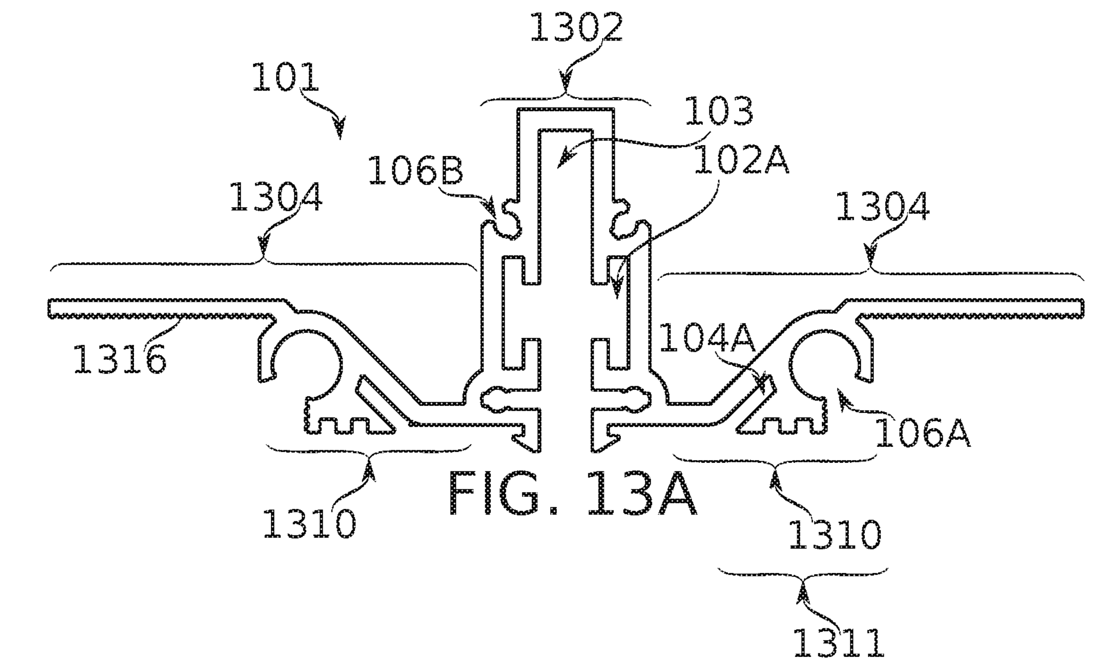
FIGS. 13A-13B schematically compare relative cross-sectional structures of two track housings, according to some exemplary embodiments of the present disclosure.
Figure 13B:
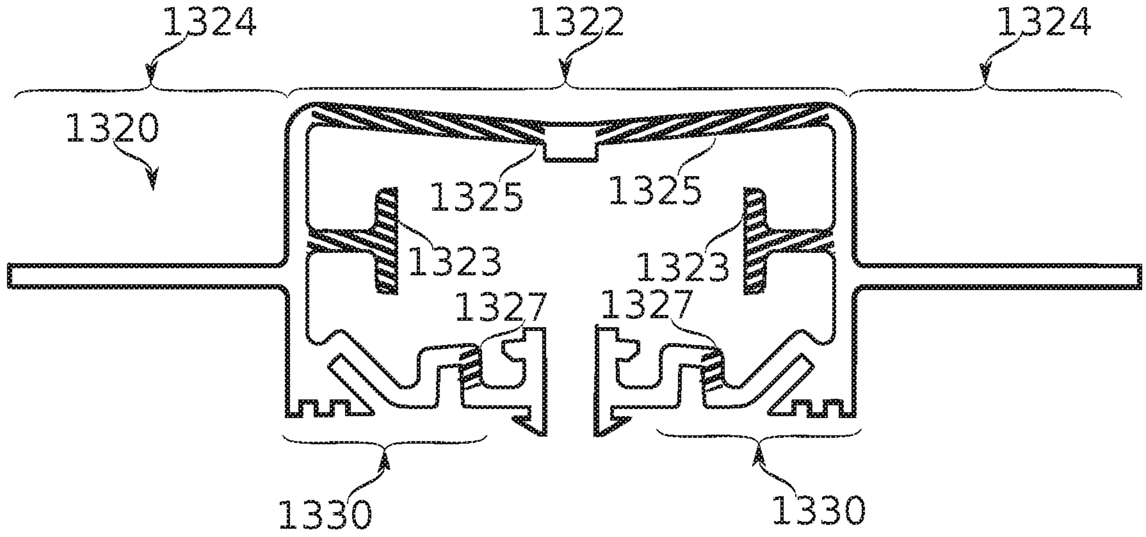

Reference is now made to FIGS. 13A-13B, which schematically compare relative cross-sectional structures of two track housings 100, 1320, according to some exemplary embodiments of the present disclosure.

Track housing 1320 comprises substantially the same cross section as is shown in FIG. 5A of International Patent Application No. IL2016/050189 to Tuchler, while track housing 101 shown is as for, for example, FIGS. 1A-1E of the present disclosure. Elements apart from the track housings have been removed to allow easier comparison.

Comparatively, track housing 101 of the present disclosure uses less material (preferably extruded aluminum or aluminum alloy) for the same track length, while maintaining about the same overall width, height, and track slot width. In some embodiments, the material savings is about equivalent to the material used in wall regions 1323, 1325, and 1327 of track housing 1320. In terms of mass, the overall reduction achieved is calculated to be from about 1.6 kg/m of track, to about 1.1 kg/m of track, while maintaining a wall thickness of about 2 mm. It is a potential advantage for track to use less material per unit length, to lower a cost of manufacturing, and/or to lower installed weight of the track lighting system.

In achieving this savings, slot housing 1302 (internal space defining slot region 103 and contact assembly receiving spaces 102A) has been reduced in width by about a factor of 3 over the size of slot housing 1322. In some embodiments, the slot housing is reduced to a maximum width less than about 25 mm, 20 mm, 18.5 mm or another larger, smaller or intermediate value. Optionally, the mounting wings 1304 each terminating in flange 116 are extended relative to mounting wings 1324 to preserve about the same overall housing width. In some embodiments, the overall width is in the range of about 80 mm-120 mm, 90-110 mm, 95-105 mm, or another overall width range having the same, larger, smaller, and/or intermediate bounds. A potential advantage of reducing the slot housing width is to save duplication of wall material on the ventral (slot-face) wall and on the dorsal wall.

In some embodiments, the main material reduction comprises transferring features of region 1330 from the ventral portion of the slot housing 1322 to be part of the mounting wings (region 1310). In some embodiments, this allows duplicate overhead material (substantially regions 1325) to be removed, since two laterally extending walls are no longer required in the design of track housing 101. This optionally is associated with one or more of the following characteristic features:

- Mounting wing 1304 extends to an outermost extent of the track housing cross-section from a base beginning at a ventral face-wall (at the face defining the slot aperture) of a slot housing 1302 defining a slot region 103 and/or contact assembly receiving space 102A.
- The shape of the mounting wing 1304 at least partially defines an anchor for a magnetically attracted mounting strip 104, for example, at least part of mounting strip receiving slot 104A.
- The shape of mounting wing 1304 face at least partially defines an alignment channel 106A sized for receiving a mating alignment pin 106.
- The shape of mounting wing 1304 comprises a ventral face region 1310 and a flange region 116 dorsally recessed from the ventral face (optionally recessed by the thickness of a standard architectural wall board; for example about 11 mm as shown in FIG. 1D), connected through an intermediate connecting region 1311 positioned laterally from any wall of the slot housing 1302.
- Optionally, one or both of the receiving slot 104A and the alignment pin receiving channel 106A are at least partially defined along the connecting region 1311.

One potential drawback of the more confined interior of slot housing 1302 is increased friction resistance by contact with the walls of rail receiving spaces 102A to the insertion of power contact assemblies 102 during manufacture. Optionally, this is mitigated by keeping manufactured track section lengths to a maximum length compatible with reliable insertion, for example, 1 m, 2 m, 3 m, or another length as appropriate to maintain manufacturability. Potential disadvantages of reduced rail length (e.g., limitations on installation length) are optionally mitigated by the use of track aligning and/or power connection systems, for example as described in relation to FIGS. 11A-11I and/or FIG. 12.

Figure 8:
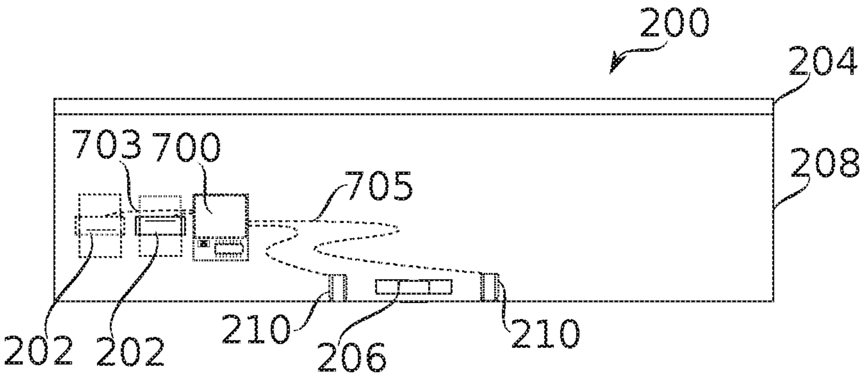
FIG. 8 schematically illustrates some interior elements of a mounting adaptor, according to some exemplary embodiments of the present disclosure.

Reference is now made to FIGS. 2A-2E, which schematically represent a mounting adaptor 200 from different view angles, according to some exemplary embodiments of the present disclosure. Reference is also made to FIG. 8, which schematically illustrates some interior elements of mounting adaptor 200, according to some exemplary embodiments of the present disclosure.

In some embodiments of the invention, adaptor housing 208 comprises two shell elements 208A, 208B that mate to form a hollow 212 enclosing other elements of the mounting adaptor (housing region 208C is shown in a partial cutaway to illustrate the hollow construction). In some embodiments, housing 208 comprises a taper 204 on its inserting side that potentially assists in aligning mounting adaptor 200 to slot aperture 103A during insertion.

Figure 2A:
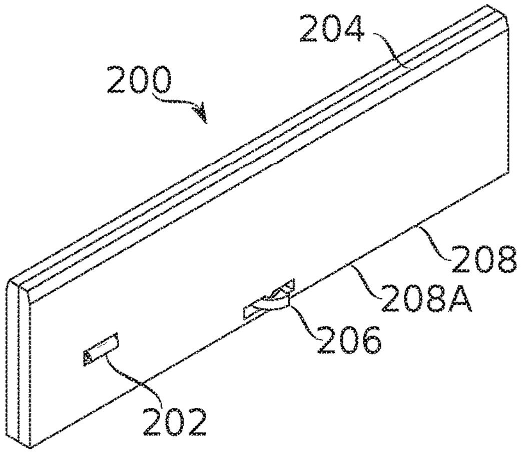
FIGS. 2A-2E schematically represent a mounting adaptor from different view angles, according to some exemplary embodiments of the present disclosure.
Figure 2B:
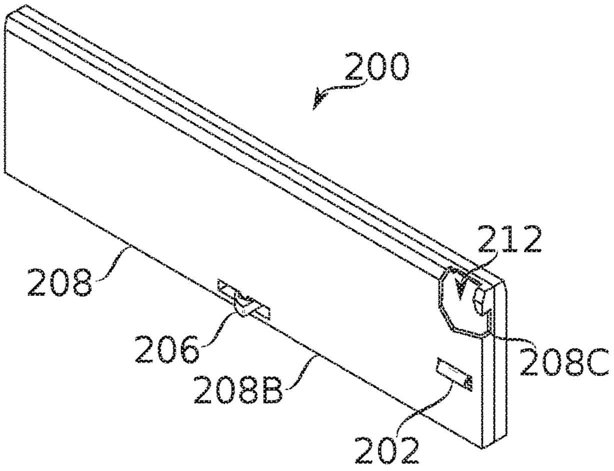
Figure 2C:
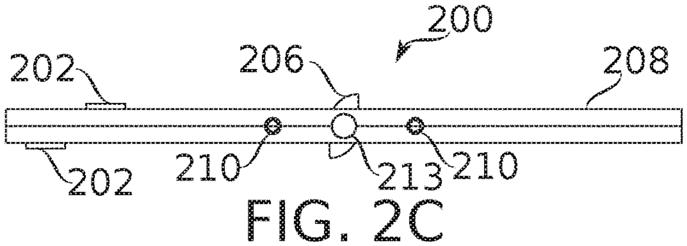
Figure 2D:
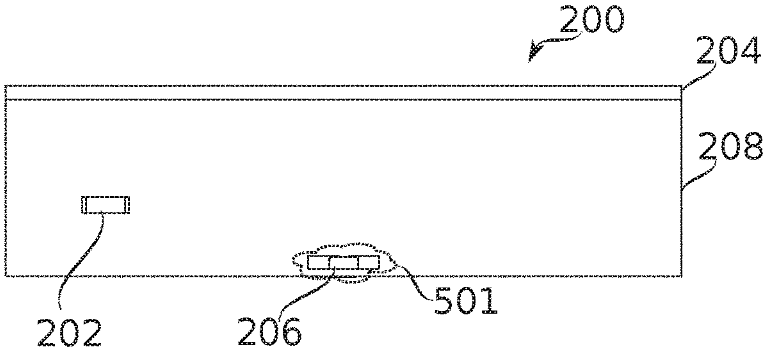
Figure 2E:
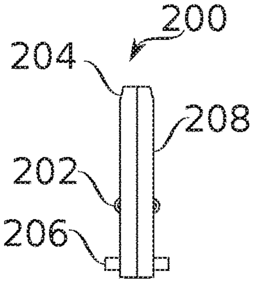
Figure 5:
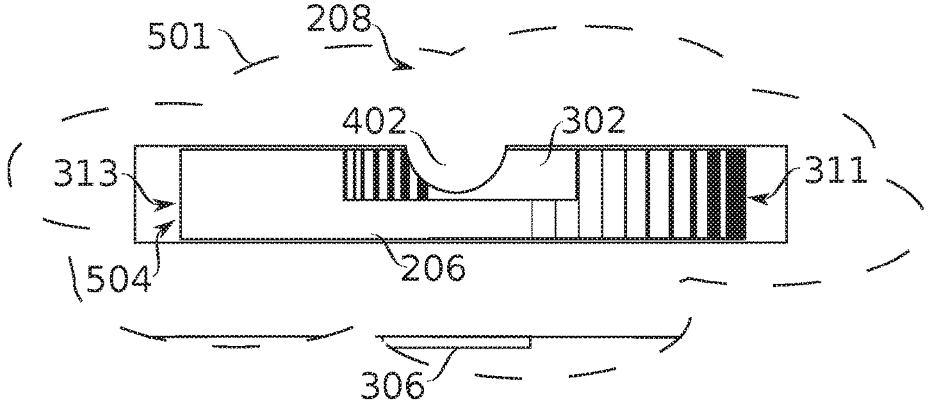
FIG. 5 schematically illustrates a magnified view of region of FIG. 2D, including anchoring element and pivot pin, according to some embodiments of the present disclosure.

In some embodiments, mounting adaptor 200 comprises a anchoring element 206. Locking element 206, in some embodiments, expands laterally from adaptor housing 208 to geometrically interfere with removal of the mounting adaptor 200 from track slot 103 once the mounting adaptor 200 is fully inserted and installed. In some embodiments, anchoring element 206 expands laterally by rotating from a collapsed position to an expanded position, for example as described in relation to FIGS. 3A-3B herein. An expanded view showing details of region 501 of FIG. 2D is shown in FIG. 5.

Optionally, electrical contacts 202 protrude from housing 208 at a position along the depth of the housing 208 that aligns with power rails 118 when the mounting adaptor is fully inserted into slot 103. The contacts may protrude on opposite sides of housing 208, offset from one another in the longitudinal direction. In some embodiments, the contacts comprise leaf-spring contacts held in place at least in part by compression within hollow 212. In some embodiments, power picked up from the power rails is passed along conductors 703 (FIG. 8) to a control circuit 700 that optionally comprises circuitry for voltage transformation, switching, conditioning, rail selection, and/or wireless communication. In some embodiments, control circuit 700 implements a wireless communication standard such as IEEE standard 802.15.4; for example, by incorporation of a ZigBee® module. Optionally, wireless control is via another wireless protocol, for example, Z-Wave®, Wi-Fi®, and/or Bluetooth®. Optionally, wireless control is used for one or more functions including: switching power on and off; addressing control to adaptor modules individually, all together, and/or in groups; and//or setting a power level (e.g., dimmer control). Optionally, control circuit 700 is configured to route voltage polarity between input conductors 703 and output conductors 705 so that the same electrical polarity is maintained at power outlets 210, no matter which insertion orientation within track 100 is chosen for the adaptor module 200.

In some embodiments, power outlets 210 comprise conductive (e.g., metallic) lugs from which power can be routed to an attached luminaire or other powered module. In some embodiments, the lugs comprise an internally threaded hole (e.g. threaded for M2 screw threads). In some embodiments, electrical connection and mechanical support are provided via separate connections; e.g., screws for mechanical support, and press-in plugs for electrical connection. Optionally free-ended wires are provided for electrical connection to an attached fixture.

Figure 3A:
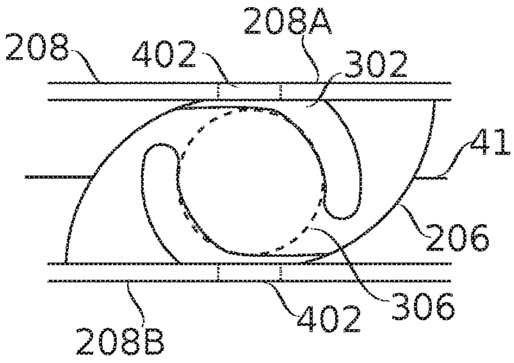
FIGS. 3A-3B schematically represent rotation of an anchoring element from a collapsed to an expanded position in relation to a housing, according to some embodiments of the present disclosure.
Figure 3B:
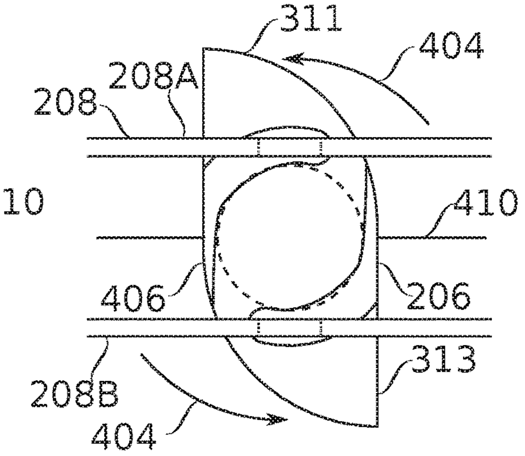

Reference is now made to FIGS. 3A-3B, which schematically represent rotation of anchoring element 206 from an undeployed (collapsed) to an deployed (laterally expanded) position in relation to housing 208, according to some embodiments of the present disclosure. Reference is also made to FIG. 5, which schematically illustrates a magnified view of region 501 of FIG. 2D; including anchoring element 206 and pivot pin 402, according to some embodiments of the present disclosure.

In some embodiments, motion of anchoring element 206 is constrained by housing 208 to a rotating motion, alternating between the collapsed position of FIG. 3A (where anchoring element 206 is substantially held within the walls of housing 208), and the deployed position of FIG. 3B, wherein anchoring element 206 is laterally expanded beyond the walls of housing 208, for example by rotation in the direction indicated by arrows 404. In some embodiments, one side 311 of each protruding end of anchoring element 206 is curved, which provides a potential advantage for the reduction of interference of a corner of anchoring element 206 with the wall of the housing 208 as it deploys. The other side of the protruding end is optionally provided as a straight side 313.

In some embodiments, anchoring element 206 comprises one or more curved tracks 302 (for example, tracks indented into the upper surface of anchoring element 206), into which fit a plurality of pins 402, one at either side wall of the housing 208. Pins 402 are optionally provided as extensions of the walls of housing 208 into the interior of a wall aperture 504 (shown in FIG. 5) through which element 206 protrudes in its expanded configuration.

In some embodiments, curved tracks 302 are left open on one side (at region 406). This provides a potential advantage for assembly, insofar as anchor element 206 (in the collapsed position) may be caught and held in its assembled place simply by pressing between the two shell halves 208A, 208B (seam line 410 shows a boundary between the assembled two shell halves), without a necessity to bend or force pin 402 into track 302.

In some embodiments, the pin-and-track arrangement is provided on both top and reverse sides of anchor element 206. Alternatively, capture of anchoring element 206 from the reverse side is by another mechanism; for example one as described in relation to FIG. 4. Another example of an anchoring element retaining mechanism is described in relation to FIGS. 10A-10B, herein.

Figure 3C:
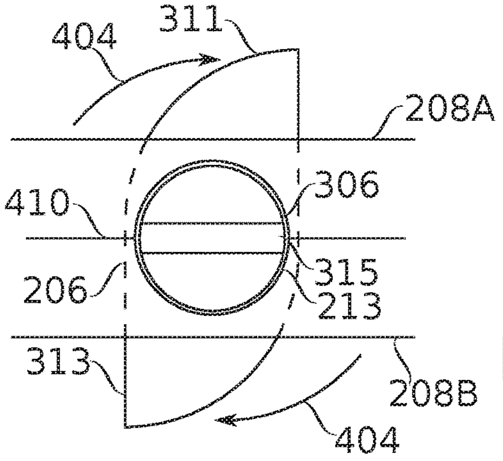
FIG. 3C shows an external view of anchoring element between two housing shell halves, including a tool-receiving slot located on pin, according to some embodiments of the present disclosure.
Figure 4:
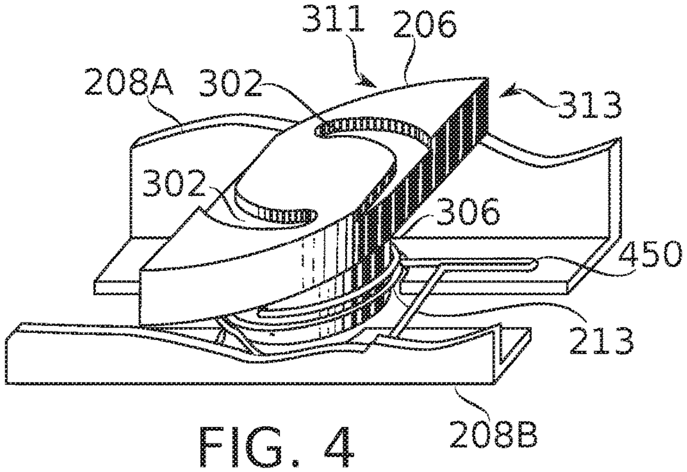
FIG. 4 schematically illustrates clamping of a pin of an anchoring element between housing shell halves, according to some embodiments of the present disclosure.

Reference is now made to FIG. 4, which schematically illustrates clamping of pin 306 of anchoring element 206 between housing shell halves 208A, 208B, according to some embodiments of the present disclosure. Reference is also made to FIG. 3C, which shows an external view of anchoring element 206 between two housing shell halves 208A, 208B including a tool-receiving shape 315 (for example, a slot) located on an exposed surface of pin 306, according to some embodiments of the present disclosure.

In some embodiments, anchoring on one side is provided for example, by the capture of pin 306 of anchoring element 206 within an aperture 213 left open by the mating of shell halves 208A, 208B. Used together with the pin-and-track mechanism, this provides three-point clamping of anchoring element 206 while also allowing freedom of rotation.

In some embodiments (FIG. 3C), tool-receiving shape 315 is provided. The shape is sized and shaped so that a portion of a tool (for example, a screwdriver tip) can be inserted and turned to manipulate the rotational position of anchoring element 206. As examples of how access to tool-receiving shape 315 may be provided: hardware attached externally to the adaptor (such as an illumination module) is optionally attached at a longitudinal offset from the position of the anchoring element 206 (keeping it clear), removably attached, provided with an access port, and/or provided with a manipulatable portion that itself interlocks with the tool-receiving shape.

In some embodiments (FIG. 4), an additional element (for example, spring 450) is provided to bias anchoring element 206 toward expansion. During insertion, anchoring element 206 may be held in the collapsed position long enough to pass track slot aperture 103A, and then freed to deploy once it reaches the level of recess 105. Optionally, anchoring element 206 is held in place by a finger. Optionally, anchoring element 206 is held in place for insertion by a piece of adhesive tape that is pulled away from a tab remaining outside of slot 103 when the mounting adaptor is fully inserted.

Figure 6:
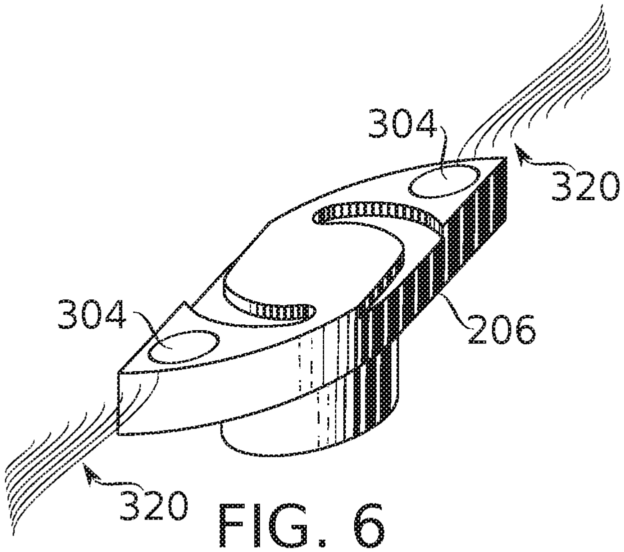
FIG. 6 schematically illustrates an anchoring element provided with at least one magnetic insert, according to some embodiments of the present disclosure.

Reference is now made to FIG. 6, which schematically illustrates element 206 provided with at least one magnetic insert 304, according to some embodiments of the present disclosure.

In some embodiments, magnets 304 are attracted in the general directions of lines of magnetic force 320 upon insertion to a slot 103; e.g., due to attraction to the material of mounting strips 104. This provides for automatic self-expansion in addition or alternative to embodiments provided with a spring 450. A potential advantage of the magnetic implementation is that the anchoring element 206 is not biased to expand until it has already been inserted into the region of magnetically attracted material. Once the magnetic anchoring element 206 is deployed, it is not necessarily dependent on continuing magnetic force to remain in position, providing continuing anchoring even if there should later be degradation of the magnetic attraction (e.g., loss of magnetic strength due to heating and/or age).

It is to be understood that other methods of anchoring element deployment may also be provided in some embodiments. For example, deployment of an expansion-biased anchoring element may be prevented until triggered by the movement of a catch element when the mounting adaptor 200 is pressed into position in slot 103. Additionally or alternatively, the pressing into position is translated into rotational movement of anchoring element 206, for example, by pressing against a ramped surface of element 206 and/or an extension thereof.

Figure 7:
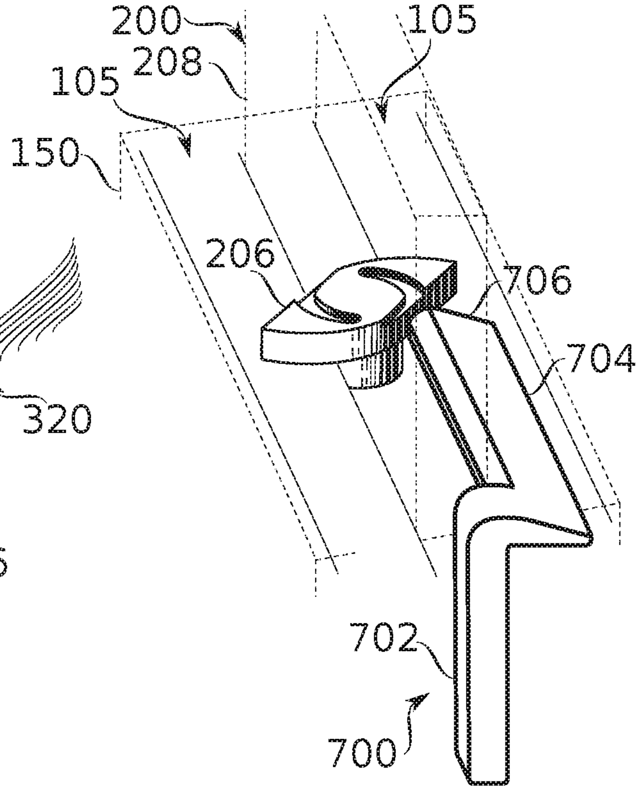
FIG. 7 schematically illustrates a tool for direct manipulation of an anchoring element, according to some embodiments of the present disclosure.

Reference is now made to FIG. 7, which schematically illustrates a tool 700 for direct manipulation of anchor element 206, according to some embodiments of the present disclosure. For context, portions of track 100 are shown in dotted lines; in particular, a surface of recess 105 into which anchoring element 206 expands is shown. Dotted lines corresponding to portions of the body of a luminaire 150 and to portions of the main housing 208 of the mounting adaptor 200 are also shown.

In some embodiments, element 206 is biased to remain expanded once it inserts into recess 105. As long as it is expanded, it is still possible to slide the mounting adaptor along the track. However, there may be occasion to remove the mounting adaptor from the track entirely. In some embodiments, a tool such as tool 700 is provided that can be manipulated by handle 702 to partially insert to recess 105. The inserted portion 704 can then be moved along the recess until tool surface 706 encounters the anchoring element 206 and presses against it. Moving further optionally rotates anchoring element 206 until it collapses (partial collapse is shown).

Additionally or alternatively, portion 704 is provided as a permanent or temporarily installed block within recess 105. Then element 206 is optionally collapsed by sliding the mounting adaptor 200 into contact with surface 704 to press against it.

In some embodiments, portion 704 of tool 700 includes a shape (for example, a hook or other projection) that can engage from within recess 105 to element 206 to push and/or pull it into an expanded position, even if element 206 is not otherwise biased toward outward expansion. In some embodiments, the hook or other projection is spring-loaded and/or hand-actuatable to assist in engaging and/or freeing tool 700 from engagement with element 206. In some embodiments, the width of portion 704 is narrow enough that tool 700 can be laterally twisted within the recess 105, allowing selective engagement/disengagement.

Figure 9A:
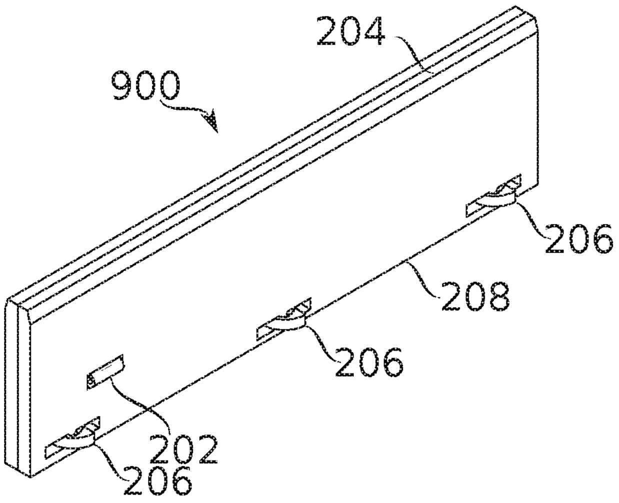
FIGS. 9A-9B schematically represent different arrangements of rotatable anchoring elements, according some embodiments of the present disclosure.
Figure 9B:
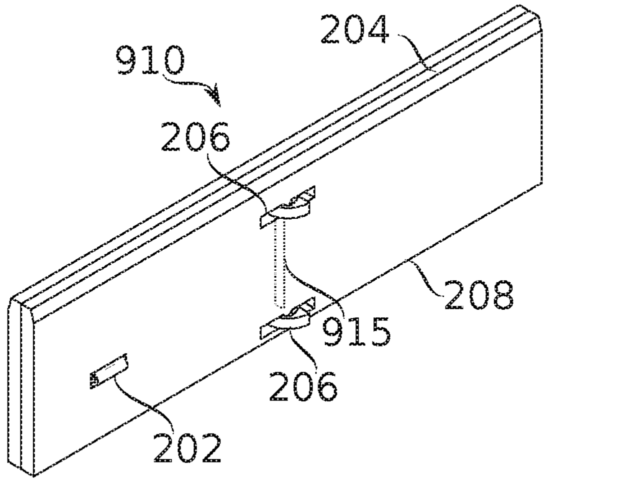

Reference is now made to FIGS. 9A-9B, which schematically represent different arrangements of rotatable anchoring elements 206, according some embodiments of the present disclosure.

In some embodiments, a plurality of anchoring elements 206 are provided along a longitudinal extent of mounting adaptor 900 (FIG. 9A). Optionally, the use of a plurality of anchoring elements increases a margin of safety, for example, in case one of the anchoring elements is accidentally collapsed. Optionally, the plurality of anchoring elements provide additional mechanical stability (e.g., to reduce rocking) in case primary mechanical support fails. Alternatively, sufficient support is provided to act as primary mechanical support, optionally obviating a need for (or becoming) a separate mechanical support mechanism, and/or reducing a requirement on the strength of separate support mechanism.

In mounting adaptor 910 of FIG. 9B, two anchoring elements are shown mechanically coupled to one another along a shaft 915. A potential advantage of this arrangement is that pushing one of the elements 206 into a collapsed position optionally forces the other into a collapsed position. The anchoring element 206 which is first pushed sufficiently far into a slot 103 then serves to prevent deployment until both it and its coupled partner both reach respective recesses into which they can deploy.

Figure 10A:
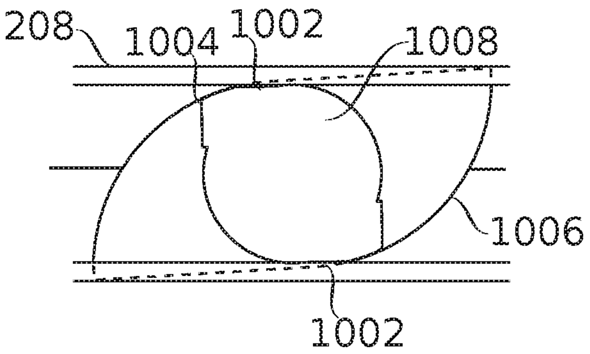
FIGS. 10A-10B schematically illustrate an alternative implementation of a rotatable anchoring element, according to some exemplary embodiments of the present disclosure.
Figure 10B:
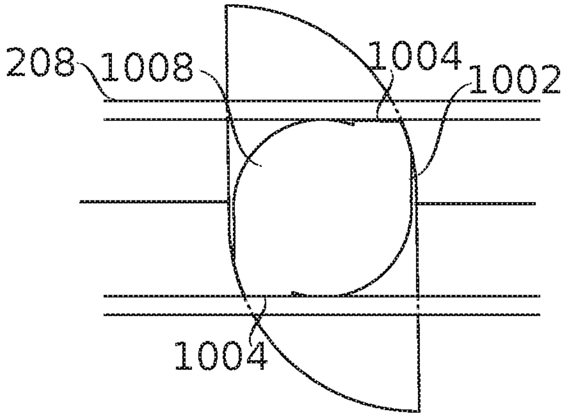

Reference is now made to FIGS. 10A-10B, which schematically illustrate an alternative implementation of a rotatable anchoring element 1006, according to some exemplary embodiments of the present disclosure.

In FIG. 10A, anchoring element 1006 is shown in a collapsed position. Escape from between the walls of housing 208 is prevented by interference between edges 1002 of central pin 2008 and inner surfaces of the walls of the housing (the pin extends out of the plane of the figure from the base provided by the main body of anchoring element 1006).

In FIG. 10B, anchoring element 1006 is shown rotated to a deployed position. Now surfaces 1004 of pin 1008 are brought into contact with the inner surfaces of the walls of housing 208, preventing further rotation.

Reference is now made to FIGS. 11A-11F, which schematically illustrate an alignment pin system for attaching segments of track housing 101 to one another, according to some exemplary embodiments of the present disclosure.

In some embodiments, alignment pin 106 comprises a plurality of transverse holes 1104 configured to receive fastening members 1102. To longitudinally align two adjacent section of track housing 101, alignment pin 106 is inserted from one end of each adjacent track housing section 101A, 101B. Optionally, the alignment pin is secured in place by fastening member 1102. In some embodiments fastening member 1102 comprises a set screw. Additionally or alternatively, fastening member 1102 inserts into a receiving aperture or recess of track housing 101 (not shown). In some embodiments, access to the fastening member 1102 is provided by opening 1103 in the side of alignment channel 106A. It is noted that recess 106B is also available, in some embodiments, as a slot for receiving an appropriately sized alignment pin. Used together, the two alignment slot types provide a potential advantage for stiffening the joint between track sections.

Figure 11A:
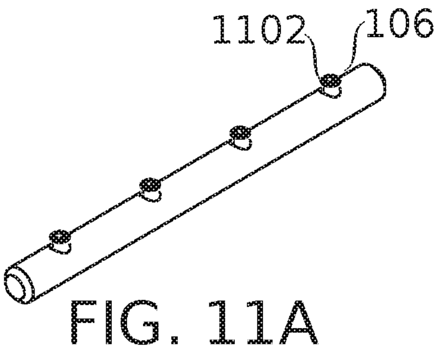
FIGS. 11A-11F schematically illustrate an alignment pin system for attaching segments of track housing to one another, according to some exemplary embodiments of the present disclosure.
Figure 11B:
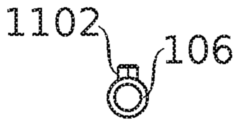
Figure 11C:
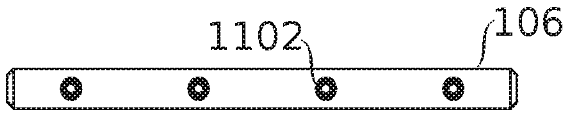
Figure 11D:
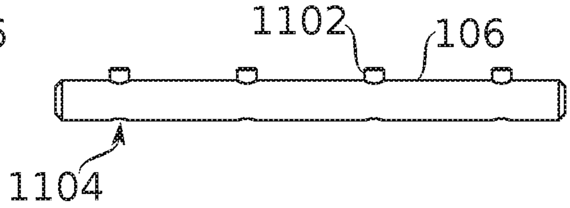
Figure 11E:
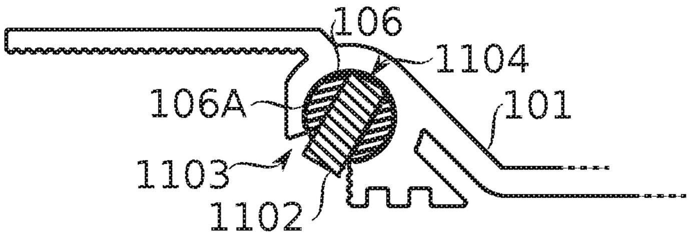
Figure 11F:
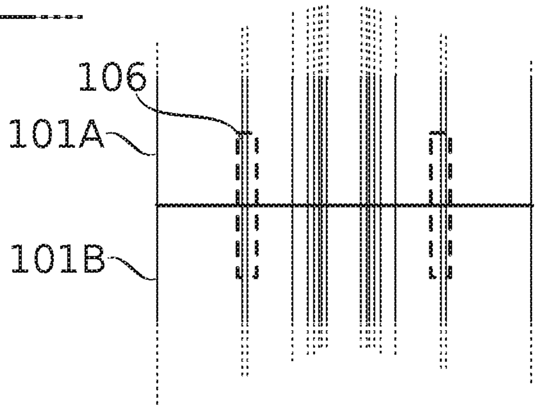
Figure 11G:
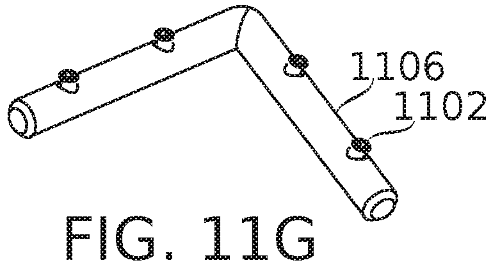
FIGS. 11G-11I schematically illustrate a corner assembly system for attaching segments of track housing to one another at an angle, according to some exemplary embodiments of the present disclosure.
Figure 11H:
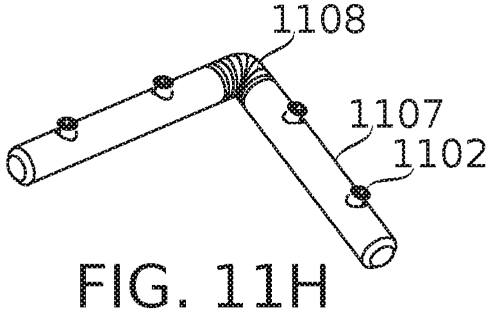
Figure 11I:
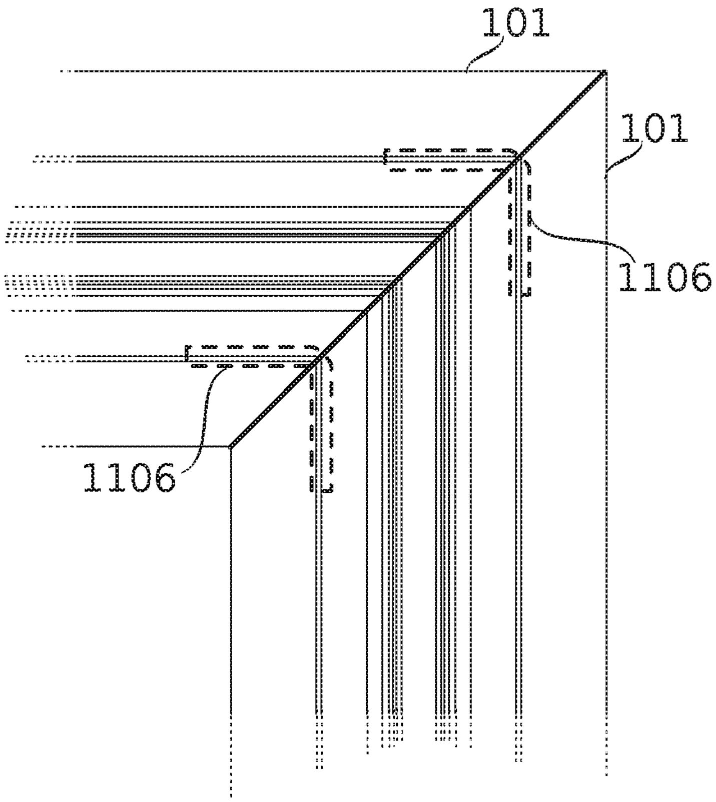

Reference is now made to FIGS. 11G-11I, which schematically illustrate a corner assembly system for attaching segments of track housing 101 to one another at an angle, according to some exemplary embodiments of the present disclosure.

In some embodiments of the invention, a fixed-angle alignment pin 1106 is provided, comprising two angled segments 1107, 1108 provided with fastening members 1102 (for example, set screws, locking pins, and/or machine screws) for securing to track housing 101. Optionally or alternatively, a flexible-angle alignment pin 1107 is provided, for example a pin with a flexible middle section 1108. In use, each end of angled alignment pin 1106, 1107 is inserted to an end of a section of track housing 101 that has been appropriate mitered (cut) to accommodate the joint angle. FIG. 11I shows an assembled corner, from a view looking down from above the track housing.

Pin systems for creating angled joins provide a potential advantage by allowing straight track housing sections to be cut at the site of installation according to need. Additionally or alternatively, in some embodiments, pre-welded corner sections 1201 are provided, for example as described in relation to FIG. 12.

Figure 12:
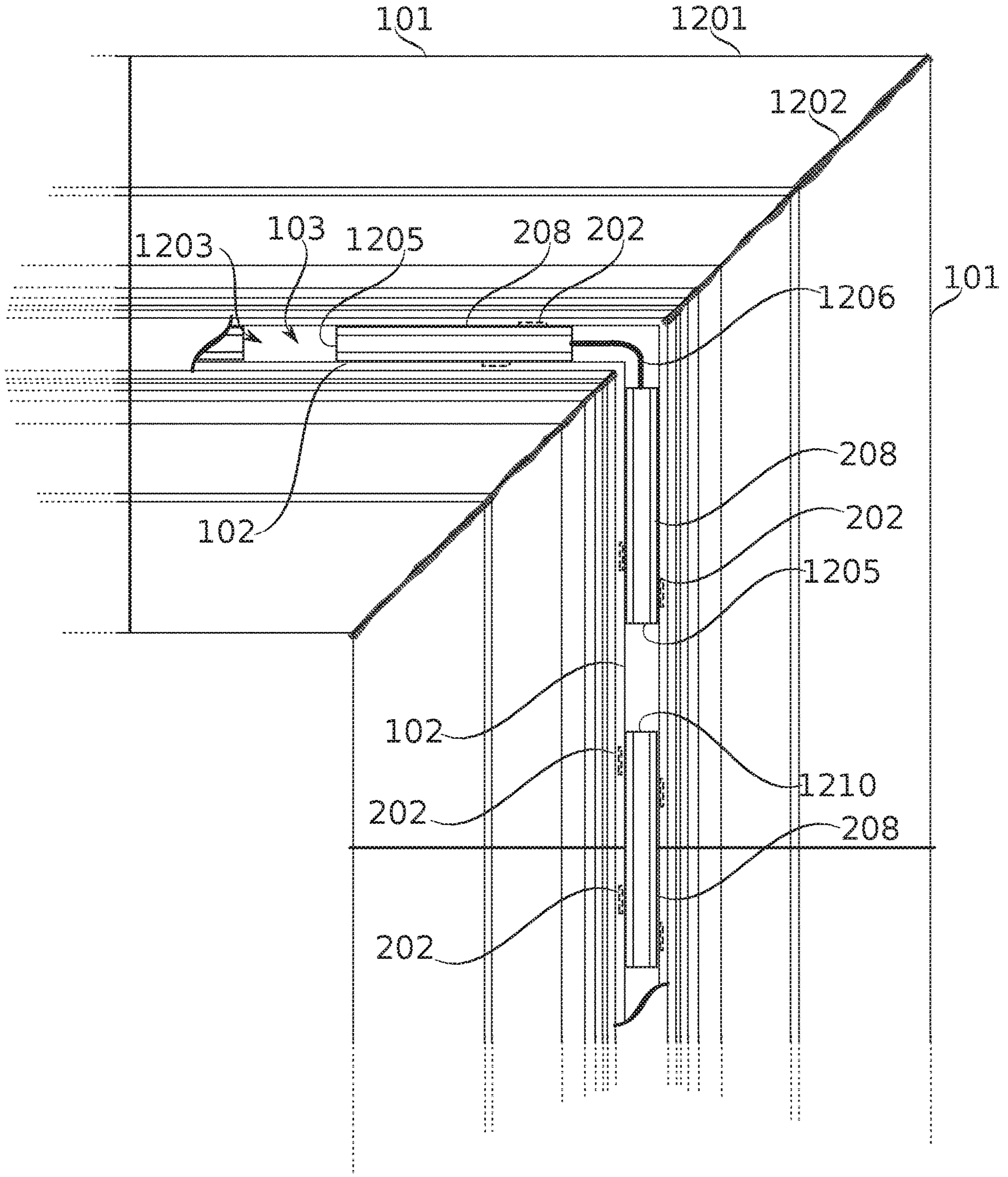
FIG. 12 schematically illustrates a system for making electrical connections between sections of track housing, according to some exemplary embodiments of the present disclosure.

Reference is now made to FIG. 12, which schematically illustrates a system for making electrical connections between sections of track housing 101, according to some exemplary embodiments of the present disclosure. FIG. 12 shows sections of track housing 101 viewed from above, with region 1203 cut away in the view in order to show details of the connector inserts 1205, 1210 inserted to the slot region 103.

In some embodiments of the invention, electrical connection is made between sections of track housing 101, and/or around corners (for example, around the corner of pre-welded corner section 1201 welded along weld line 1202) by use of one or more connection inserts 1205, 1210.

Optionally, a single connection insert 1210 (that is optionally constructed from an adaptor housing 208 like that used for a mounting adaptor 200) comprises electrodes 202 positioned to make electrical contact with the contact assemblies 102 of each of two sections of track housing 101 being joined together. Corresponding electrodes 202 are linked via the connection insert 1210 (e.g., by a wire running inside housing 208), so that electrical power can be transmitted from one section to the next.

In some embodiments, electrical connection of contact assemblies 102 around corners (for example, but not only around a corner defined by pre-welded corner section 1201) is made through a pair of connection inserts 1205 joined by a corner conductor 1206. Optionally, corner conductor 1206 comprises a flexible conductive material, such as metal wire. Optionally, corner conductor 1206 comprises a flexible circuit board, round cabling, and/or ribbon cable. Each connection insert 1205 includes electrodes 202 that are interconnected via corner conductor 1206 to electrically join the contact assemblies 102 of adjacent sections of track housing 101. Optionally, pairs of joined connection inserts 1205 are used to electrically connect track sections across straight joins, instead of a unibody connector such as connection insert 1210.

It should be understood that connection inserts 1205, 1210 configured and used to electrically interconnect track sections are optionally also configured to function as fixture mounting adaptors 200. This provides a potential advantage for allowing any position along track to be available for positioning fixtures, including junctures between sections. It should be noted that there is a synergy between this option and the feature of some embodiments which allows track sections to be aligned by interconnections lateral to the mounting slot. Using this feature, the mounting slot itself optionally remains clear of obstructions, and so available for fixture mounting.

Method of Attaching Adaptor to Track

Figure 14:
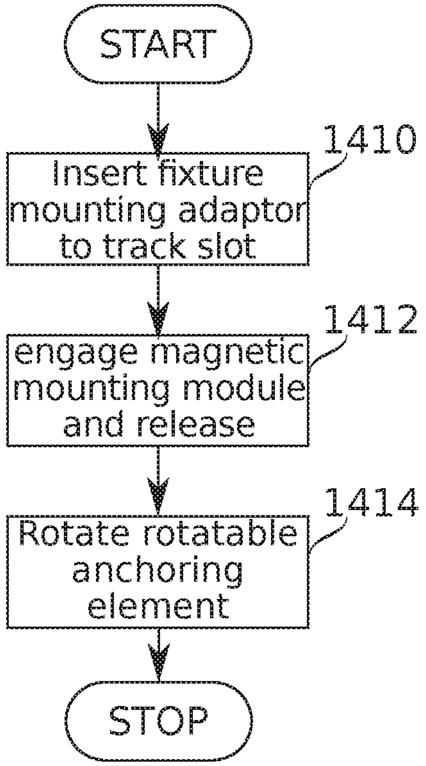
FIG. 14 is a flowchart schematically representing the attachment to a track lighting track of a mounting assembly including a fixture mounting adaptor and a magnetic mounting module, according to some embodiments of the present disclosure.

Reference is now made to FIG. 14, which is a flowchart schematically representing the attachment to a track lighting track of a mounting assembly including a fixture mounting adaptor 200 and a magnetic mounting module 170, according to some embodiments of the present disclosure. In some embodiments, magnetic mounting module 170 also acts as a powered module; for example, luminaire 150. In some embodiments, a separate powered module is attached to magnetic module 170, for example as described in relation to FIG. 1E. Herein, the mounting assembly including one or more optional attached powered modules is referred to as a fixture assembly.

At block 1410, in some embodiments, the fixture assembly is held (e.g., gripped by hand or by a holding tool), and the fixture mounting adaptor 200 of the mounting assembly is inserted to the track slot.

At block 1412, in some embodiments, insertion of the fixture mounting adaptor 200 brings the magnetic mounting module 170 into proximity with the track 100 so that magnetic mounting module 170 becomes magnetically engaged with the track 100, for example, magnetically engaged with mounting strips 104. Next, in some embodiments, the mounting assembly (including any attached hardware) is optionally released from the hand hold or tool grip, and remains with its weight magnetically secured to the track (optionally, some fractional portion of the weight is borne by the fixture mounting adaptor 200).

At block 1414, in some embodiments, rotatable anchoring element 206 is rotated from a closed position to a locking position, for example, by use of a tool inserted to the track (e.g., as described in relation to FIG. 7), by a tool inserted to engage with a manipulating member of element 206 (for example, tool receiving shape 315), and/or by an exposed control member connected by a mechanical linkage to rotate element 206.

A potential advantage of this method of mounting is that the initial positioning steps (insertion and magnetic engagement) are optionally performed tool-free and/or with relatively gross control (for example, the device can be readily inserted to a high-mounted track and engaged magnetically thereto at the end of a long mounting pole). Another potential advantage of this method of mounting is that the step of engaging the rotating anchoring element is optionally performed without simultaneously supporting the weight of the mounting assembly (and optional attached fixture). Another potential advantage is the support of one-handed (optionally one-poled) installation, since the insertion and anchor deployment steps are each optionally one-handed, and moreover optionally performed in sequence without maintaining a constant grip on the mounting assembly (including any attached hardware).

General

It is expected that during the life of a patent maturing from this application many relevant illumination sources will be developed; the scope of the term illumination source is intended to include all such new technologies a priori.

As used herein with reference to quantity or value, the term “about” means “within ±10% of”.

The terms “comprises”, “comprising”, “includes”, “including”, “having” and their conjugates mean: “including but not limited to”.

The term “consisting of” means: “including and limited to”.

The term “consisting essentially of” means that the composition, method or structure may include additional ingredients, steps and/or parts, but only if the additional ingredients, steps and/or parts do not materially alter the basic and novel characteristics of the claimed composition, method or structure.

As used herein, the singular form “a”, “an” and “the” include plural references unless the context clearly dictates otherwise. For example, the term “a compound” or “at least one compound” may include a plurality of compounds, including mixtures thereof.

The words “example” and “exemplary” are used herein to mean “serving as an example, instance or illustration”. Any embodiment described as an “example” or “exemplary” is not necessarily to be construed as preferred or advantageous over other embodiments and/or to exclude the incorporation of features from other embodiments.

The word “optionally” is used herein to mean “is provided in some embodiments and not provided in other embodiments”. Any particular embodiment of the invention may include a plurality of “optional” features except insofar as such features conflict.

As used herein the term “method” refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term “treating” includes abrogating, substantially inhibiting, slowing or reversing the progression of a condition, substantially ameliorating clinical or aesthetical symptoms of a condition or substantially preventing the appearance of clinical or aesthetical symptoms of a condition.

Throughout this application, embodiments of this invention may be presented with reference to a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. Components of a track lighting system comprising:

a track comprising a track housing having:

a slot housing sized for receiving a fixture mounting adaptor within a slot volume located between two outer side-walls extending dorsally alongside each other from a slotted face-wall and on either side of an aperture to the slot volume in the slotted face-wall, power contact assemblies comprising electrical power rails extending longitudinally along the track and within the slot, magnetically attracted material attached to the track housing, and two mounting wings, each mounting wing comprising a wall extending laterally from a base region integrally attached to a respective one of the side-walls where the side-wall meets the slotted face-wall; and a mounting adaptor sized to fit within the slot and make electrical contacts with the electrical power rails;

wherein:

the mounting adaptor is attached in a mounting assembly with a mounting module including magnetically attracted material, wherein at least one of the magnetically attracted material of the mounting module and the magnetically attracted material attached to the track housing is magnetic, and the mounting assembly is sized and shaped so that the mounting assembly is magnetically held to the magnetically attracted material attached to the track housing when the mounting adaptor is inserted to the slot to make electrical contacts with the power contact assemblies; and wherein each mounting wing laterally terminates in a region dorsally offset from the base region.

2. The track lighting system components of claim 1, wherein the slot aperture is about 8 mm wide or less.

3. The track lighting system components of claim 1, wherein the maximum width of the slot housing is 25 mm or less.

4. The track lighting system components of claim 1, wherein the magnetically attracted material attached to the track housing comprises at least one magnetically attracted mounting strip attached to the track housing by a mounting strip anchor; wherein the mounting strip anchor is at least partially defined by one of the mounting wings.

5. The track lighting system components of claim 4, wherein the mounting strip anchor comprises a slot region sized to receive and hold the magnetically attracted mounting strip.

6. The track lighting system components of claim 5, wherein the mounting strip anchor slot region is defined in part along a longitudinal extent of the slotted face-wall, and in part along a longitudinal extent of the mounting wing.

7. The track lighting system components of claim 1, wherein each mounting wing defines a longitudinally extending alignment channel, open on at least one longitudinal end to receive an alignment pin for aligning the track housing to another track housing.

8. The track lighting system components of claim 1, wherein the mounting wing wall extends:

laterally from the base region through a support section to define, along with the slotted face-wall, a mounting face for support of modules inserted to the slot of the track housing;

then laterally and dorsally through an intermediate section to reach the region dorsally offset from the base region; and then laterally to define a mounting flange within the region dorsally offset from the base region.

9. Components of aThe track lighting system components of claim 1, wherein:

the track includes an interior recessed region recessed from the walls of the mounting slot on either side of the mounting slot, and located adjacent to an interior side of the slotted face-wall, the recessed region also extending longitudinally along the slot; and wherein the fixture mounting adaptor comprises an anchoring element positioned to be aligned with and expand into the interior recessed region when the fixture mounting adaptor is fully inserted into the mounting slot.

10. The track lighting system components of claim 1, wherein the mounting slot has an entrance aperture with a width less than 8 mm across, and wherein the mounting adaptor comprises:

a rotatable anchoring element attached to the housing, configurable to a first orientation fitting within the width of the entrance aperture during insertion of the housing to the track, and rotatable from the first orientation to a second orientation extending beyond the width of the entrance aperture into a recessed region of the track;

wherein the rotatable anchoring element in the second orientation is sized and shaped to freely move along with the housing through the recessed region along a longitudinal axis of the track.

11. The track lighting system components of claim 10, wherein the mounting adaptor comprises electrical contacts positioned to electrically contact power rails within the slot of the track, and the rotatable anchoring element aligns the fixture mounting adaptor in a position where electrical contact is maintained upon the movement of the housing along the longitudinal axis of the track.

12. The track lighting system components of claim 10, wherein the anchoring element is biased by a tensioning member to rotate from the first to the second orientation.

13. The track lighting system components of claim 10, wherein the recessed region includes a blocked section, wherein the block in the blocked section is shaped to press against and rotate the rotatable anchoring element back to the first orientation when the fixture mounting adaptor is positioned near to the blocked section, allowing the fixture mounting adaptor to be removed from the mounting slot.

14. The track lighting system components of claim 10, including a collapsing tool comprising a releasing member attached to a handle at a relative position where the releasing member is positionable to occupy a portion of the recessed region when it is inserted along with a portion of the handle into the mounting slot; wherein the releasing member extends longitudinally from the handle to a sufficient distance that it can be maneuvered alongside the mounting adapter in the mounting slot to press the rotatable anchoring element back to the first orientation.

15. The track lighting system components of claim 10, wherein a pin portion of the rotatable anchoring element comprises a tool receiving shape accessible from the exterior of the fixture mounting adaptor, the tool receiving shape being formed to transmit torque from a received portion of a tool so that the rotatable anchoring element is rotatable by the tool.

16. The track lighting system components of claim 15, wherein the tool receiving shape comprises a slot sized to receive a tip of a screwdriver.

17. The track lighting system components of claim 16, wherein the mounting adaptor comprises:

a wall aperture in each side-wall; and a rotatable anchoring element extending within the housing between the two wall apertures;

wherein the rotatable anchoring element is held to the housing by interference with the two side-walls surrounding the two wall apertures.

18. The track lighting system components of claim 17, wherein the rotatable anchoring element is rotatable to alternatively extend in the direction of the width of the housing to a first extent less than a width of an entrance aperture into the slot, or to a second extent greater than said width.

19. The lighting system components of claim 1, wherein the mounting adaptor comprises:

a rotating anchoring element held at least partially within the housing, and configured to rotate from a collapsed insertion position to an anchoring position extending wider than the entrance aperture upon insertion of the housing to the mounting slot.

20. A method of mounting a fixture to a track lighting track, the fixture including a magnetic mounting module attached to a fixture mounting adaptor with a deployable anchoring element, the method comprising:

pushing the fixture mounting adaptor into a slot defined by a slot aperture of the track lighting track, thereby bringing the magnetic mounting module to magnetically engage a magnetically attracted material of the track lighting track, and thereby positioning the undeployed anchoring element inside the slot;

releasing the fixture, allowing the weight of the fixture to be substantially supported by the magnetic engagement of the magnetic mounting module; and then deploying the anchoring element to engage across the slot so that the fixture mounting adaptor is geometrically prevented from being pulled from the slot.

* * * * *